(12) United States Patent
Kempshall et al.

(10) Patent No.: US 11,702,194 B1
(45) Date of Patent: *Jul. 18, 2023

(54) CONVERTIBLE DUCTED FAN ENGINE

(71) Applicant: Hyalta Aeronautics, Inc., St. Petersburg, FL (US)

(72) Inventors: Scott R. Kempshall, St. Petersburg, FL (US); Nicholas Pfeifer, Clearwater, FL (US)

(73) Assignee: Hyalta Aeronautics, Inc., St. Petersburg, FL (US)

(*) Notice: Subject to any disclaimer, the term of this patent is extended or adjusted under 35 U.S.C. 154(b) by 511 days.

This patent is subject to a terminal disclaimer.

(21) Appl. No.: 16/898,583

(22) Filed: Jun. 11, 2020

Related U.S. Application Data

(63) Continuation-in-part of application No. 16/517,242, filed on Jul. 19, 2019, now Pat. No. 11,519,418, and a continuation-in-part of application No. 16/414,448, filed on May 16, 2019, now Pat. No. 11,454,245, which is a continuation-in-part of application No.
(Continued)

(51) Int. Cl.
| | |
|---|---|
| *B64C 37/00* | (2006.01) |
| *B64C 11/00* | (2006.01) |
| *B60F 5/02* | (2006.01) |
| *F04D 29/32* | (2006.01) |
| *B64C 25/66* | (2006.01) |
| *F04D 29/52* | (2006.01) |
| *B64C 25/36* | (2006.01) |
| *B64C 25/40* | (2006.01) |
| *B64C 25/32* | (2006.01) |
| *F01D 15/00* | (2006.01) |

(52) U.S. Cl.
CPC ............... *B64C 25/66* (2013.01); *B60F 5/02* (2013.01); *B64C 11/001* (2013.01); *B64C 25/36* (2013.01); *B64C 25/405* (2013.01); *B64C 37/00* (2013.01); *F04D 29/526* (2013.01); *B60F 2301/04* (2013.01); *F01D 15/00* (2013.01); *F04D 29/326* (2013.01)

(58) Field of Classification Search
CPC ...... F04D 29/326; F04D 29/526; F01D 15/00; B64C 11/001; B64C 25/66; B64C 25/36; B64C 25/405; B64C 37/00; B60F 5/02
See application file for complete search history.

(56) References Cited

FOREIGN PATENT DOCUMENTS

| CN | 204506376 U | * | 7/2015 |
|---|---|---|---|
| CN | 112078298 A | * | 12/2020 |

OTHER PUBLICATIONS

English Translation of CN-204506376-U (Zhao et al., Jul. 2015) (Year: 2022).*

(Continued)

*Primary Examiner* — David E Sosnowski
*Assistant Examiner* — Aye S Htay
(74) *Attorney, Agent, or Firm* — Nicholas Pfeifer; Smith & Hopen, P.A.

(57) ABSTRACT

A convertible ducted fan engine and mounting system. The convertible ducted fan engine has a shroud encircling a mechanical fan. The convertible ducted fan engine includes a fluid-propulsion configuration in which the mechanical fan rotates freely with respect to the shroud to produce thrust through fluid flow, and a drive-wheel configuration in which the shroud rotates about the rotational axis.

20 Claims, 28 Drawing Sheets

Related U.S. Application Data

16/225,951, filed on Dec. 19, 2018, now Pat. No. 11,333,032, which is a continuation-in-part of application No. 15/209,383, filed on Jul. 13, 2016, now Pat. No. 10,180,083.

(60) Provisional application No. 62/854,938, filed on May 30, 2019.

(56) References Cited

OTHER PUBLICATIONS

English Translation of CN-112078298-A (Zhang et al. Dec. 2020) (Year: 2022).*
Website https://www.turbosquid.com/3d-models/3in1-drone-car-boat-hybrid-sci-fi-3d-model-1327003, accessed Apr. 18, 2019.

* cited by examiner

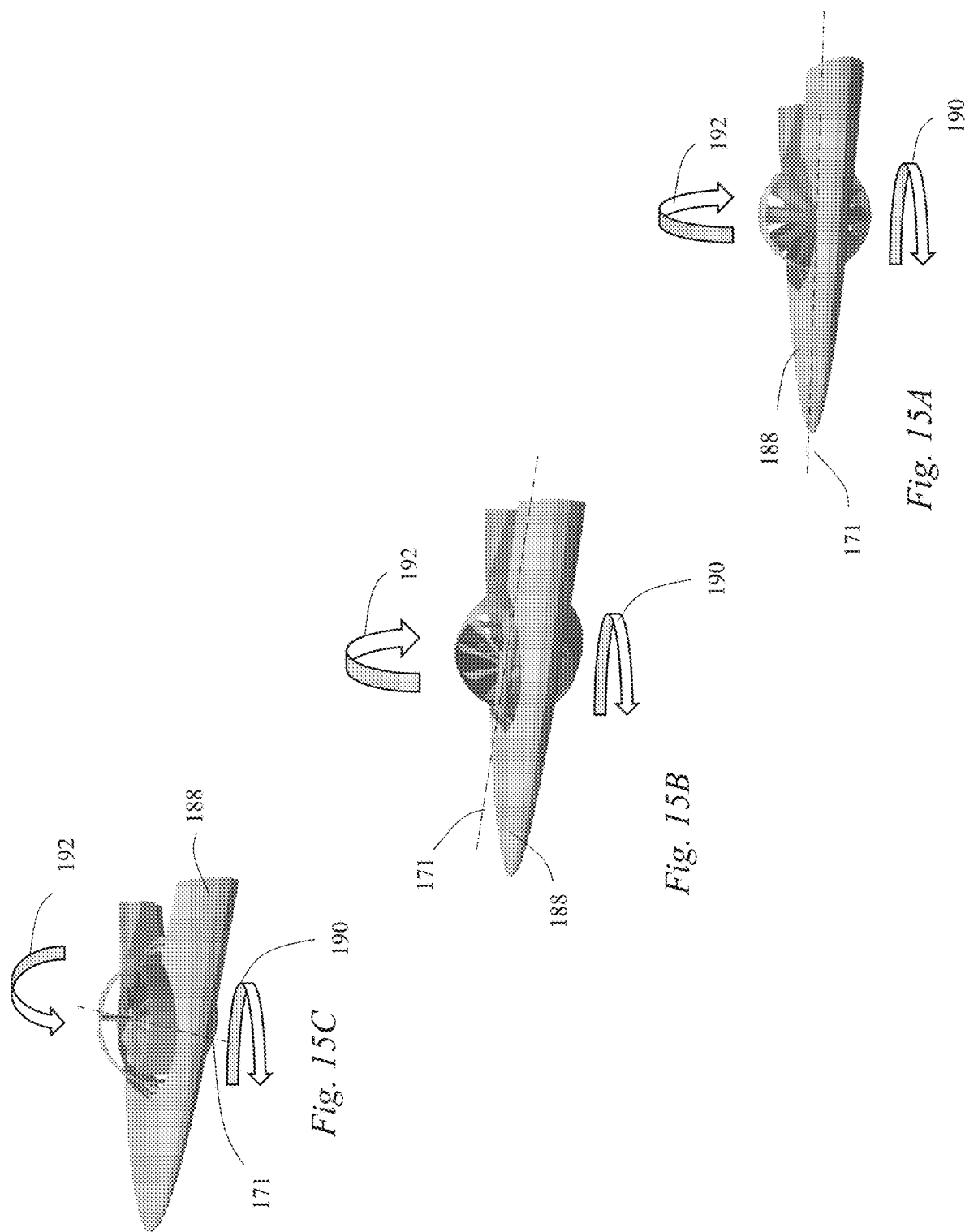

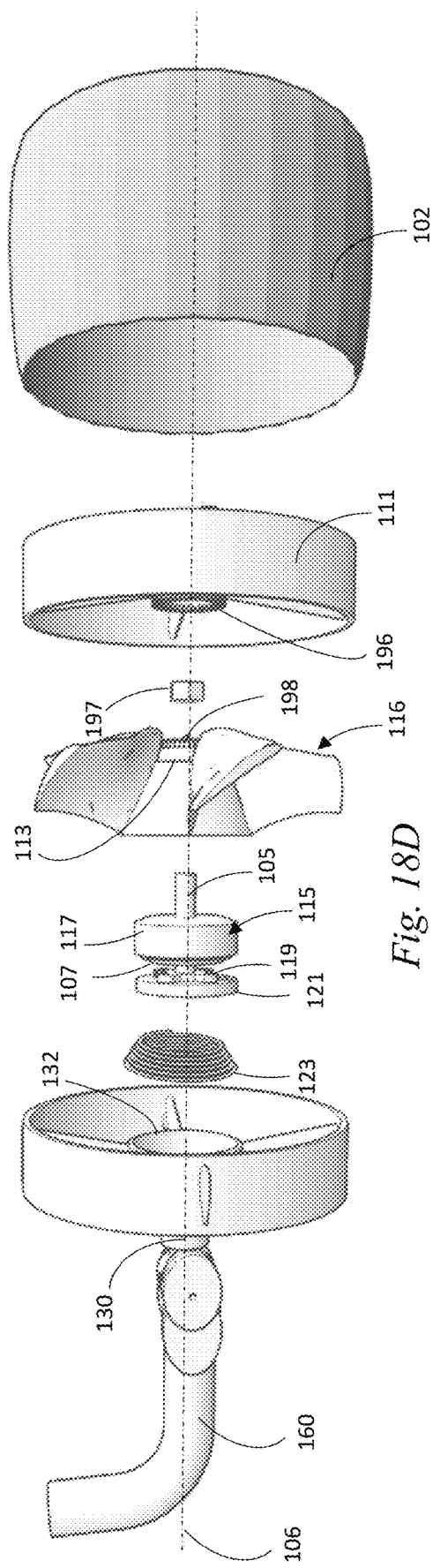
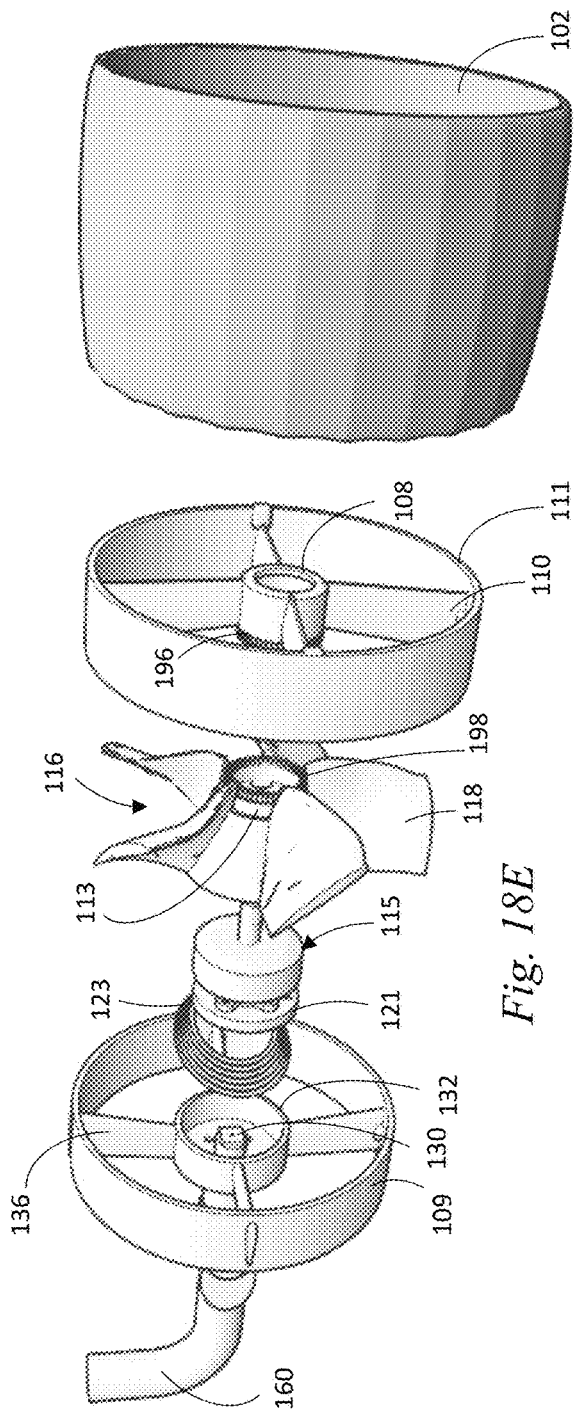
Fig. 18D
Fig. 18E

CONVERTIBLE DUCTED FAN ENGINE

CROSS-REFERENCE TO RELATED APPLICATIONS

This nonprovisional application is a continuation-in-part of and claims priority to nonprovisional application Ser. No. 16/517,242, entitled "MOUNTING SYSTEM FOR CONVERTIBLE DUCTED FAN ENGINE," filed Jul. 19, 2019 by the same inventor, which claims priority to provisional application No. 62/854,938, entitled "HYBRID CONVERTIBLE ENGINE AND MOUNTING SYSTEM," filed May 30, 2019 by the same inventor and is also a continuation-in-part of and claims priority to nonprovisional application Ser. No. 16/414,448, entitled "CONVERTIBLE DUCTED FAN ENGINE," filed May 16, 2019 by the same inventor, which is a continuation-in-part of and claims priority to nonprovisional application Ser. No. 16/225,951, entitled "CONVERTIBLE DUCTED FAN ENGINE," filed Dec. 19, 2018 by the same inventor, which is a continuation-in-part of and claims priority to nonprovisional application Ser. No. 15/209,383, entitled "CONVERTIBLE DUCTED FAN ENGINE," filed Jul. 13, 2016, issued on Jan. 15, 2019 as U.S. Pat. No. 10,180,083, by the same inventor.

BACKGROUND OF THE INVENTION

1. Field of the Invention

This invention relates to a mounting system for a ducted fan engine capable of converting between a typical fluid-propulsion configuration and a drive-wheel configuration.

2. Brief Description of the Prior Art

The current state of the art includes a plurality of distinct thrust producing engines. Typically, these engines are single purpose drive systems designed around the type of vehicle (e.g. ground vehicles, watercraft, or aircraft) on which they are intended to operate. For example, a drive-wheel—a tire connected to a rotating shaft—provides propulsion for land vehicles, while propellers or turbines are connected to a drive shaft to provide propulsion for aircrafts and watercrafts.

Some hybrid vehicles can operate in multiple mediums, such as, amphibious automobiles, which are capable of operating on land and water. Such vehicles, however, require separate or reconfigurable drive systems. For example, amphibious automobiles have a drive system for land-based travel and a separate propulsion system for aquatic-based travel. Both separate and reconfigurable drive systems are less than ideal. Reconfigurable drive systems can be complex and thus more susceptible to failure, while separate drive systems occupy twice the space and require twice the fuel compared to a single drive system.

Accordingly, what is needed is convertible engine that can operate as a fluid-propulsion engine and also as a friction-based drive-wheel. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a convertible engine that can operate as a fluid-propulsion engine and also as a friction-based drive-wheel is now met by a new, useful, and nonobvious invention.

The novel structure of the convertible ducted fan engine includes a shroud connected to a shroud shaft, a drive shaft connected to a mechanical fan, a rotational drive motor configured to rotate the drive shaft and mechanical fan, and a linear drive motor configured to translate the drive shaft and mechanical fan in a direction parallel to a longitudinal axis of the shroud shaft. The mechanical fan includes a plurality of blades concentrically arranged about a rotational axis. The fundamental functionality of this design encompasses any combination of mechanical (e.g. stops), electromechanical (e.g. actuated latches) or electrical (e.g. electromagnetic clutches or couplers) devices that facilitate both: 1) rotation of the shroud relative to the vehicle axle/body in the drive-wheel configuration, and 2) facilitates fan rotation relative to a stationary shroud in the fluid propulsion configuration.

The convertible ducted fan engine includes a fluid-propulsion configuration in which the mechanical fan rotates freely with respect to the shroud to produce thrust through fluid flow, and a drive-wheel configuration in which at least one of the blades in the plurality of blades is in contact with or coupled to the shroud, thereby causing concurrent rotation of the shroud and mechanical fan when the mechanical fan rotates about the rotational axis.

In an embodiment, the drive shaft is configured to move the mechanical fan both (1) into contact with the shroud to place the ducted fan engine into the drive-wheel configuration and (2) out of contact with the shroud to place the ducted fan engine into the fluid-propulsion configuration. An embodiment includes the shroud shaft aligned with the rotational axis and the drive shaft configured to telescopically receive the shroud shaft. In an embodiment this arrangement could be reversed with the fan translating on the telescoping shaft and the shroud mounted to the axle shaft.

In an embodiment, the ducted fan engine includes a blade-contacting flange disposed on an internal surface of the shroud and extending a distance inwardly towards the central longitudinal axis of the shroud. The blade-contacting flanges extends inwardly a distance that is greater than the difference between the outer diameter of the mechanical fan and the inner diameter of the shroud.

An embodiment includes the blade-contacting flange located proximate to a fore end of shroud, such that the drive-wheel configuration is achieved by translating the mechanical fan towards the fore end of the shroud until at least one of the blades in the plurality of blades comes in contact with the blade-contacting flange. The fluid-propulsion configuration is achieved by translating the mechanical fan towards an aft end of the shroud until none of the blades in the plurality of blades can contact the blade-contacting flange when the mechanical fan rotates about the rotational axis.

An embodiment further includes traction improving material or features disposed on an outer surface of the shroud. This increases the traction between a shroud-contacting surface and the shroud when the ducted fan engine operates in the drive-wheel configuration.

An embodiment includes a drive shaft and a translation collar, wherein the drive shaft is configured to translate in a direction parallel to a longitudinal axis of the translation collar. A mechanical fan is interconnected with the drive shaft, such that movement of the drive shaft in an axial direction causes movement of the mechanical fan in the axial direction. The mechanical fan has a plurality of blades concentrically arranged about a rotational axis and is configured to rotate about the rotational axis. In addition, a shroud is interconnected with the translation collar. The embodiment includes a fluid-propulsion configuration in which the mechanical fan rotates freely with respect to the shroud to produce thrust through fluid flow and a drive-wheel configuration in which at least one of the blades in the plurality of blades is incapable of rotating with respect to the shroud, thereby causing concurrent rotation of the shroud and mechanical fan when the mechanical fan rotates about the rotational axis.

In an embodiment, the drive-wheel configuration includes at least one of the blades in the plurality of blades in contact or coupled to the shroud. An embodiment further includes the translation collar having a linear drive motor to translate the mechanical fan parallel to a longitudinal axis of the shroud.

Like previous embodiments, this embodiment may also include a blade-contacting flange disposed on an internal surface of the shroud and extending a distance inwardly towards the central longitudinal axis of the shroud, where the distance is greater than the difference between an outer diameter of the mechanical fan and the inner diameter of the shroud.

In an embodiment, the ducted fan engine includes an outer shroud encircling a plurality of blades with the shroud having an electrical coil connected to a power source. A collar is concentrically located with respect to the outer shroud and receives at least a portion of a proximal body in a rotationally free relation. A first clutch is disposed between the collar and the proximal body, wherein the first clutch can be engaged to prevent relative rotation between the collar and the proximal body. The proximal body is secured to a mounting arm at a first end and is in rotational communication with a distal body at a second end. The distal body is in mechanical communication with the plurality of blades and a second clutch is disposed between the proximal and distal bodies. The second clutch can be engaged to prevent relative rotation between the proximal and distal bodies. In addition, at least one blade in the plurality of blades has a ferric, magnetic, or electromagnetic component disposed proximate a free end of the blade. The electrical coil can be electrified to cause or prevent rotation of the plurality of blades with respect to the shroud, and the first and second clutches enable the ducted fan engine to operate as a propulsion engine or a drive-wheel.

In an embodiment, operation as the propulsion engine includes the first clutch engaged to prevent the proximal body from rotating with respect to the collar secured to the shroud, the second clutch disengaged to allow the distal body to rotating with respect to the proximal body, and the electrical coil being electrifying to cause the plurality of blades to rotate with respect to the shroud.

In an embodiment, operation as the drive-wheel includes the first clutch disengaged to allow the collar secured to the shroud to rotate with respect to the proximal body, the second clutch engaged to prevent the distal body secured to the plurality of blades from rotating with respect to the proximal body, and the electrical coil electrified to cause the shroud to rotate with respect to the plurality of blades.

An embodiment of the present invention is a convertible craft having at least one convertible ducted fan engine pivotally secured to the craft. The ducted fan engine includes a shroud encircling a mechanical fan. The shroud has an internal surface establishing an inner diameter that is greater in size than an outer diameter of the mechanical fan. The mechanical fan has a plurality of blades concentrically arranged about a rotational axis, wherein each blade in the plurality of blades has an extent originating from the rotational axis and terminating at a distal free end. The distal free ends of each blade effectively create the outer diameter of the mechanical fan. a fluid-propulsion configuration in which the plurality of blades are free to rotate with respect to the shroud to produce thrust through fluid flow; and a drive-wheel configuration in which an outer surface of the shroud is in physical contact with a ground surface and the shroud is configured to rotate about the rotational axis, thereby enabling the shroud to roll along the ground surface.

An embodiment further includes a drive shaft. The mechanical fan is configured to translate in an axial direction along the drive shaft, thereby enabling the mechanical fan to change location within the shroud along the longitudinal axis of the shroud.

An embodiment further includes a blade-contacting flange located proximate to a fore end of the shroud, such that the drive-wheel configuration is achieved by translating the mechanical fan along the translation shaft towards the fore end of the shroud until at least one of the blades in the plurality of blades comes in contact with the blade-contacting flange. The fluid-propulsion configuration is achieved by translating the mechanical fan along the translation shaft towards an aft end of the shroud until none of the blades in the plurality of blades can contact the blade-contacting flange when the mechanical fan rotates about the rotational axis. Other methods known to a person of ordinary skill in the art can be used to couple/decouple the fan and motor to achieve the two modes of operation.

An embodiment further includes traction improving material or features disposed on an outer surface of the shroud. This increases the traction between a shroud-contacting surface and the shroud when the ducted fan engine operates in the drive-wheel configuration.

An embodiment of the craft further includes the convertible engine having an electrical coil disposed on or in the shroud and the electrical coil is connected to a power source. A collar is concentrically located with respect to the outer shroud, the collar receiving at least a portion of a proximal body in a rotationally free relation. A first clutch is disposed between the collar and the proximal body. The first clutch can be engaged to prevent relative rotation between the collar and the proximal body. The proximal body is secured to a mounting arm at a first end and is in rotational communication with a distal body at a second end. The distal body is in mechanical communication with the plurality of blades and a second clutch is disposed between the proximal and distal bodies. The second clutch can be engaged to prevent relative rotation between the proximal and distal bodies. In addition, at least one blade in the plurality of blades has a magnetic component disposed proximate a free end of the blade. The electrical coil can be electrified to cause or prevent rotation of the plurality of blades with respect to the shroud, and the first and second clutches enable the ducted fan engine to operate as a propulsion engine or a drive-wheel.

In an embodiment of the convertible craft, the operation of the convertible engine as a propulsion engine includes the first clutch engaged to prevent the proximal body from rotating with respect to the collar secured to the shroud, the second clutch disengaged to allow the distal body to rotating with respect to the proximal body, and the electrical coil being electrifying to cause the plurality of blades to rotate with respect to the shroud.

In an embodiment of the convertible craft, the operation of the convertible engine as a drive-wheel includes the first clutch disengaged to allow the collar secured to the shroud to rotate with respect to the proximal body, the second clutch engaged to prevent the distal body secured to the plurality of blades from rotating with respect to the proximal body, and the electrical coil electrified to cause the shroud to rotate with respect to the plurality of blades.

An embodiment of the ducted fan engine includes gyroscopic mounting system. The mechanical fan is in communication with a power source that causes the fan to rotate about a rotational axis, and the mechanical fan has a plurality of blades concentrically arranged about the rotational axis. A shroud is concentrically aligned with the mechanical fan about the rotational axis. The engine includes a fluid-propulsion configuration in which the mechanical fan rotates freely with respect to the shroud to produce thrust through fluid flow and a drive-wheel configuration in which the shroud rotates about the rotational axis.

The gyroscopic mount is integrated with or attachable to a craft. The gyroscopic mount has a first gimbal ring, a second gimbal ring, and a third gimbal ring. The first gimbal ring encircles the shroud, the second gimbal ring encircles the first gimbal ring, and the third gimbal ring encircles the second gimbal ring. The first ring is adapted to rotate about a first axis with respect to the second ring, the second ring is adapted to rotate about a second axis with respect to the third ring. An axel extends from the first gimbal towards the mechanical fan and is in mechanical communication with the mechanical fan. The gyroscopic mount can alter the orientation of the mechanical fan by pivoting the first gimbal ring, the second gimbal ring, or the third gimbal ring.

In an embodiment, the first and second axes are nonparallel. In an embodiment, the first and second axes are perpendicular. In an embodiment, the ducted fan engine further includes a circular track system adapted to rotate at least the ducted fan engine about a third axis.

In an embodiment, the drive-wheel configuration includes the shroud mechanically or electromagnetically engaged with a rotational component of the fan engine, such that the shroud rotates simultaneously with the mechanical fan. In an embodiment, a blade-contacting flange is disposed on an internal surface of the shroud and extends a distance inwardly towards the rotational axis. The distance of the flange is greater than a difference between an outer diameter of the mechanical fan and an inner diameter of the shroud.

Some embodiments of the ducted fan engine include a motor and a mechanical fan configured to be rotated by the motor about a rotational axis. The mechanical fan has a plurality of blades, and a shroud that at least partially surrounds the mechanical fan or motor. The engine has a fluid-propulsion configuration in which the mechanical fan rotates freely with respect to the shroud to produce thrust through fluid flow and a drive-wheel configuration in which the mechanical fan and/or a rotational component of the motor is configured to cause the shroud to rotate about the rotational axis in response to rotation of the mechanical fan and/or the rotational component of the motor.

Some embodiments include an aft collar in non-rotational mechanical communication with the shroud. The aft collar has a first interlocking component (which could be mechanical, electro-mechanical or electrical) and the mechanical fan has a second interlocking component (which could be mechanical, electro-mechanical or electrical). The fluid-propulsion configuration includes the first interlocking component and the second interlocking component operably disengaged, while the drive-wheel configuration includes the first interlocking component and the second interlocking component operably engaged. In an embodiment, a spring applies a biasing force that causes the second interlocking component to move towards the first interlocking component or the first interlocking component to move towards the second interlocking component. In an embodiment, the second interlocking component is disposed on a hub of the mechanical fan. The hub is radially closer to the rotational axis than the plurality of blades.

Some embodiments include a fore translation collar in non-rotational mechanical communication with the shroud. The fore translation collar has a first interlocking component and the mechanical fan has a second interlocking component. The fluid-propulsion configuration includes the first interlocking component and the second interlocking component operably disengaged, while the drive-wheel configuration includes the first interlocking component and the second interlocking component operably engaged. In an embodiment, a spring applies a biasing force that causes the second interlocking component to move towards the first interlocking component or the first interlocking component to move towards the second interlocking component. In an embodiment, the second interlocking component is disposed on a hub of the mechanical fan. The hub is radially closer to the rotational axis than the plurality of blades.

An embodiment includes a tread disposed on an outer surface of the shroud, thereby providing traction between a shroud-contacting surface and the shroud when the ducted fan engine operates in the drive-wheel configuration.

An embodiment of the engine mounting system is attachable to or integrated with a craft and includes a first gimbal ring and a circular track system. The first gimbal ring encircles a ducted fan engine, and the first gimbal ring is nonconcentric with a shroud on the ducted fan engine. An axel extends from the first gimbal ring to the ducted fan engine. In addition, the first gimbal ring is adapted to pivot about a first axis extending through a pair of diametrically opposed pivotable pins. In an embodiment, the first axis is nonparallel with the axel.

The circular track system is adapted to rotate at least the ducted fan engine about a central track axis that is nonparallel to the first axis. The gyroscopic mount can thereby alter the orientation of the ducted fan engine by pivoting first gimbal ring about the first axis or rotating the ducted fan about the second axis.

An embodiment includes a second gimbal ring adapted to pivot about a second axis extending through a pair of diametrically opposed pivotable pins. In an embodiment, the second axis is nonparallel with the first axis. In an embodiment the central track axis is nonparallel with the second axis. In an embodiment, the first and second axes are perpendicular to each other. In an embodiment, the axel is concentrically aligned with the shroud.

An embodiment includes a third gimbal ring. The third gimbal ring encircles the second gimbal ring and is secured to the second gimbal ring through a pair of diametrically opposed pivotable pins.

An embodiment of the engine mounting system is attachable to or integrated with a craft, and includes a first gimbal ring, a second gimbal ring, and a circular track system. The first gimbal ring encircles a ducted fan engine, and the first gimbal ring is nonconcentric with respect to a shroud on the ducted fan engine. An axel extends from the first gimbal ring to the ducted fan engine. A first pair of diametrically opposed pivotable pins extends between the first ring and a second ring. Moreover, the first gimbal ring is adapted to pivot about a first axis extending through the first pair of diametrically opposed pivotable pins, and the first axis is nonparallel with the axel.

The second gimbal ring is adapted to pivot about a second axis extending through a second pair of diametrically opposed pivotable pins, and the second axis is nonparallel with the first axis.

The circular track system is adapted to rotate at least the ducted fan engine about a third axis. As a result, the gyroscopic mount can alter the orientation of the ducted fan engine by pivoting the first gimbal ring about the first axis, the second gimbal ring about the second axis, or rotating the ducted fan about the third axis.

In an embodiment, the central track axis is nonparallel with the second axis. In an embodiment, the first and second axes are perpendicular to each other. In an embodiment, the axel is concentrically aligned with the shroud.

An embodiment further includes a third gimbal ring. The third gimbal ring encircles the second gimbal ring and is secured to the second gimbal ring through a pair of diametrically opposed pivotable pins.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 15A is a perspective view of an embodiment of the mounting system secured to a craft having a single convertible engine with the engine shown in a drive-wheel configuration.

FIG. 15B is a perspective view of an embodiment of the mounting system secured to a craft having a single convertible engine with the engine shown transitioning from a drive-wheel configuration to a propulsion configuration.

FIG. 15C is a perspective view of an embodiment of the mounting system secured to a craft having a single convertible engine with the engine shown in a vertical takeoff and landing (VTOL) orientation.

FIG. 18D is an exploded view of an embodiment of the convertible ducted fan engine.

FIG. 18E is an exploded view of an embodiment of the convertible ducted fan engine.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Drive-Wheel Configuration: is a configuration where the shroud is configured to rotate about the rotational axis similar to a wheel on a land vehicle.

Fluid-Propulsion Configuration: is a configuration where the mechanical fan is configured to rotate about the rotational axis.

Shroud: is a structure intended to at least partially surround the mechanical fan.

Tread: is a material disposed on the external surface of the shroud that is intended to increase traction between the shroud and the shroud-contacting surface.

The present invention includes a convertible ducted fan engine having a drive-wheel configuration and a fluid-propulsion configuration. The convertible ducted fan engine includes a shroud and a mechanical fan. In the drive-wheel configuration, the shroud is configured to rotate about the rotational axis. As a result, the shroud effectively becomes a rotating drive-wheel. In the fluid-propulsion configuration, the mechanical fan is free to rotate about the rotational axis, with respect to the shroud, to produce thrust as is typical with a propeller.

Figure 1A:
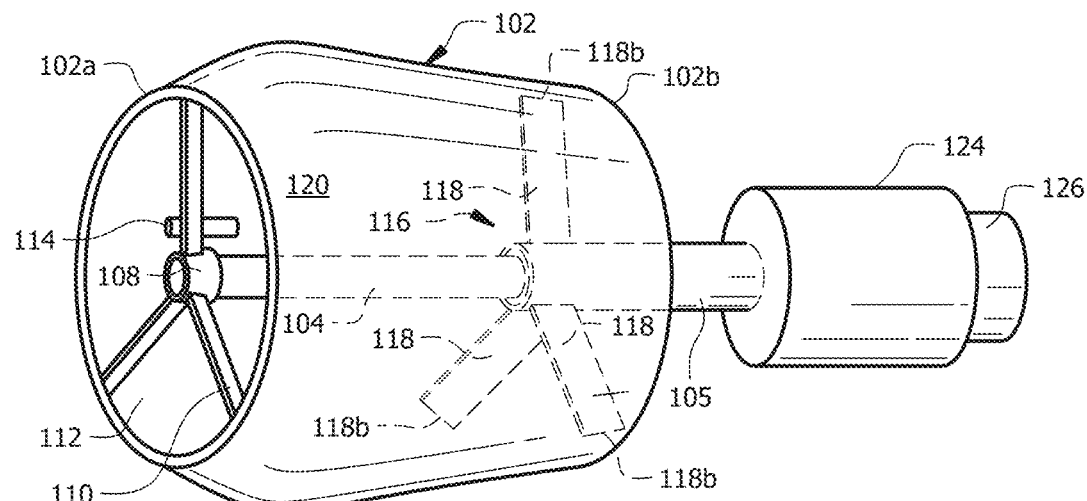
FIG. 1A is a perspective view of an embodiment of the present invention, in which the mechanical fan is retracted towards the aft end of the shroud such that rotation of the mechanical fan does not cause rotation of the shroud.
Figure 1B:
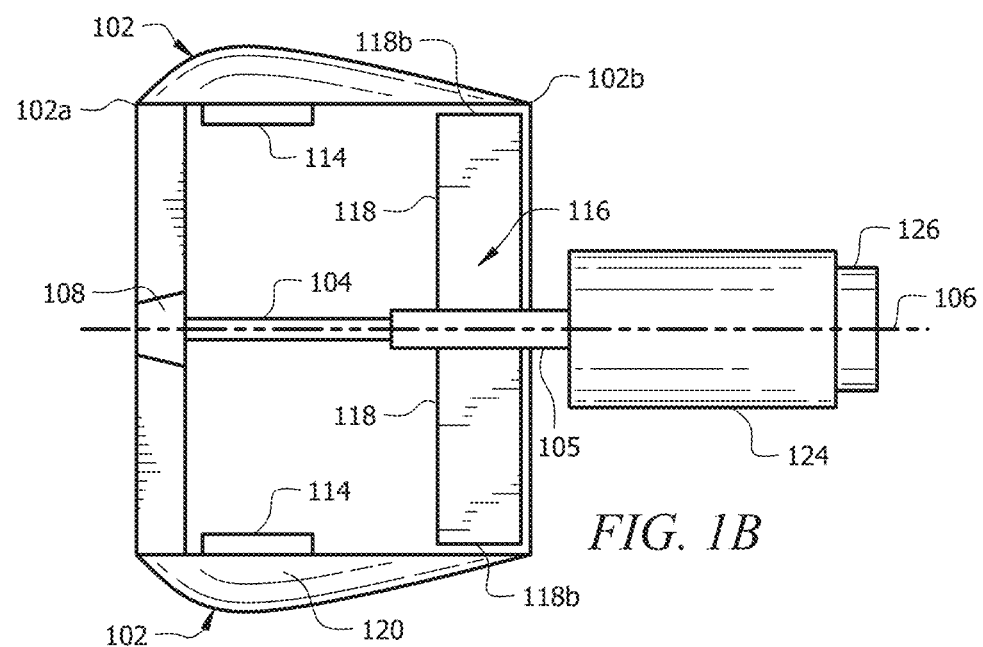
FIG. 1B is a top view of the embodiment shown in FIG. 1A with an upper section of the shroud removed to view the internal area of the shroud.
Figure 2A:
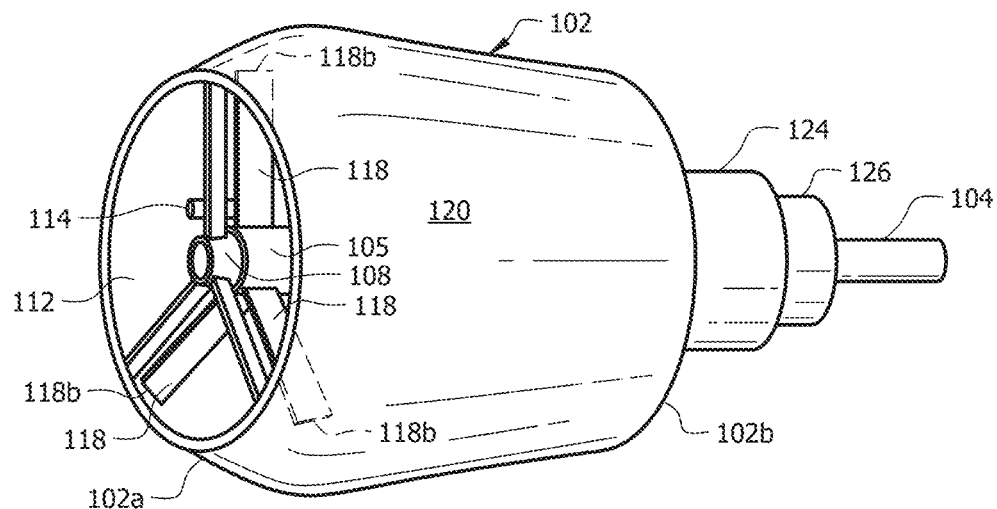
FIG. 2A is a perspective view of an embodiment of the present invention, in which the mechanical fan is located proximate to the fore end of the shroud such that rotation of the mechanical fan causes rotation of the shroud.

Referring now to FIGS. 1-2, an embodiment of the convertible ducted fan engine includes shroud 102 secured to a shroud shaft 104 at fore end 102a of shroud 102. Shroud shaft 104 is centrally aligned with longitudinal axis 106 of shroud 102 through collar 108. Collar 108 is also centrally aligned with longitudinal axis 106 and is fixed in place through supports 110, which extend radially to the internal surface 112 of shroud 102. An embodiment may include a secondary collar and corresponding supports secured to the aft end of the shroud. The secondary collar would be sized to slidably receive drive shaft 105 at a location aft of the mechanical fan 116 so as not to impair the translation of the mechanical fan 116. As an alternative, the secondary collar slidably receives the motor housing 124 rather than drive shaft 105. Such an embodiment would require the motor housing to remain at least partially within the shroud in both the drive-wheel and the fluid-propulsion configuration.

Internal surface 112 also includes blade-contacting flange 114 extending inwardly towards longitudinal axis 106. Blade-contacting flange 114 extends inwardly a distance that is greater than the difference between the inner diameter of shroud 102 and the outer diameter of mechanical fan 116. The outer diameter of mechanical fan 116 is established by distal free ends 118b of blades 118. As depicted in the exemplary embodiment, blade-contacting flange 114 is disposed proximate to fore end 102a of shroud 102. Blade-contacting flange 114, however, may be located anywhere along internal surface 112, such that blades 118 can contact blade-contacting flange 114 when mechanical fan 116 is moved into radial alignment with blade-contacting flange 114. In an embodiment, several blade-contacting flanges may be disposed on internal surface 112 to better secure mechanical fan 116 when the engine is in the drive-wheel configuration. An embodiment may include other methods known to a person of ordinary skill in the art to couple/decouple the fan and motor to achieve the two modes of operation.

Figure 2B:
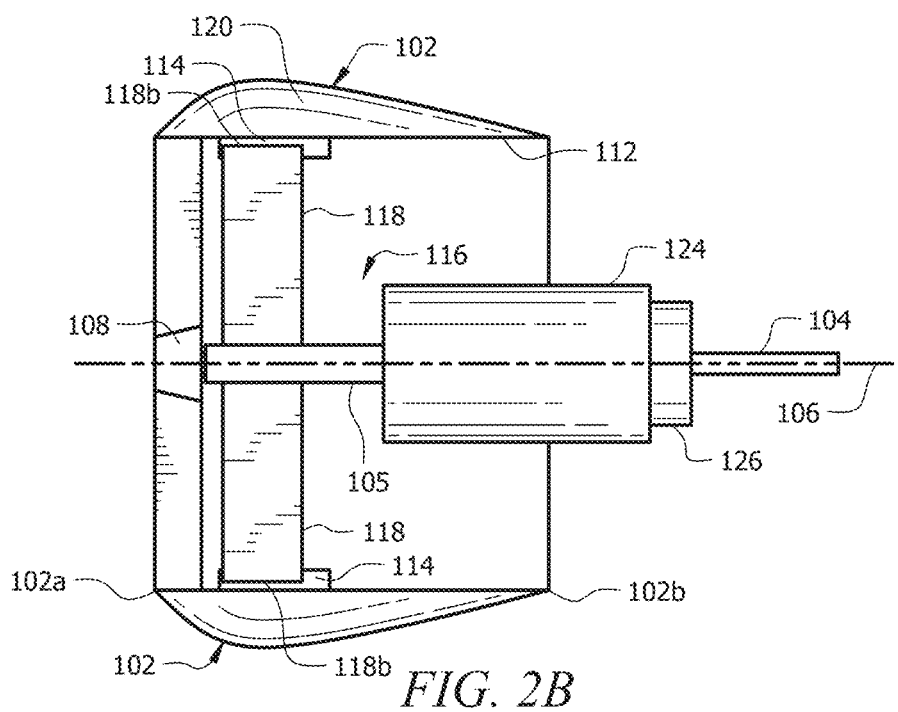
FIG. 2B is a top view of the embodiment shown in FIG. 2A with an upper section of the shroud removed to view the internal area of the shroud.

As mostly clearly depicted shown in FIGS. 1B and 2B, internal surface 112 of the exemplary embodiment is cylindrical in shape. The uniform cylindrical shape allows mechanical fan 116 to freely transition between the fore and aft ends 102a, 102b of shroud 102. Or in other words, mechanical fan 116 can easily move (1) into radial/transversal alignment with blade-contacting flange 114 as shown in FIG. 2B, and (2) out of radial/transversal alignment with blade-contacting flange 114 as shown in FIG. 1B. In an embodiment, the cross-section of internal surface 112 may be non-uniform along longitudinal axis 106 of shroud 102. A non-uniform cross-section may be used instead of one or more blade-contacting surfaces to establish concurrent rotation of the mechanical fan and the shroud. For example, the internal surface may be tapered at a certain location along the longitudinal axis of the shroud giving the tapered section an internal diameter that is equal to or less than the outer diameter of the mechanical fan. Translation of the mechanical fan into the tapered section press-fits the mechanical fan into the tapered section to allow for concurrent rotation of the mechanical fan and the shroud. Alternatively, the tapered section may include a plurality of grooves to receive the blades, which has a similar functionality as the blade-contacting flange.

As depicted in the exemplary embodiment shown in FIGS. 1, shroud 102 has a length, extending about longitudinal axis 106, that is greater than the combined length of blade-contacting flange 114 and mechanical fan 116. The lengths of blade-contacting flange 114 and mechanical fan 116 also extend in a direction parallel to the longitudinal axis. The minimum length of shroud 102 is preferably at least the combined length of blade-contacting flange 114 and blades 118. An embodiment, however, may include a shroud not intended to house the mechanical fan when the convertible ducted fan engine is in the fluid-propulsion configuration. Such an embodiment may employ a shroud having a length less than the embodiment shown in FIGS. 1-2. Preferably, the length of the shroud would at least match the length of the mechanical fan.

External surface 120 of shroud 102 includes an aerodynamic taper from fore end 102a to aft end 102b. The tapered shape reduces aerodynamic drag when the convertible ducted fan engine is operating as a fluid-propulsion engine. In an embodiment, the external surface 120 has a non-tapered shape to provide greater traction when the convertible ducted fan engine is operating as a drive-wheel. In an embodiment, external surface 120, includes tread for improving traction when the convertible ducted fan engine is operating as a drive-wheel. In addition, the tread may include longitudinal grooves to improve aerodynamic performance when the convertible ducted fan engine is operating as a fluid-propulsion engine. The tread may include any combination of grooves to improve traction and/or decrease aerodynamic drag.

In an embodiment, external surface 120 of shroud 102 includes one or more bands/ribs of material wrapped around the outer surface of the shroud. For example, external surface 120 may be axially ribbed, which would improve traction and would have a minimal effect on airflow over the external surface of the shroud. Moreover, an embodiment includes a shroud that is easily removable for maintenance or replacement. Detachable collar(s) and corresponding supports allows the mechanical fan to easily exit the shroud for maintenance/replacement.

In an embodiment, screens are added to the fore and/or aft ends of the shroud to reduce the possibility of large objects accumulating in the inner surface of the shroud. This combined with a controlled process between configurations would minimize possibility of damage to the mechanical fan. This situation is far more critical to the airborne application as the waterborne application would naturally wash material from the internal surface of the shroud after transitioning to water.

Mechanical fan 116 includes a plurality of blades 118 extending outwardly from drive shaft 105. The distal ends of each blade establish an outer diameter of the mechanical fan. As depicted in the exemplary embodiment shown in FIGS. 1-2, the blades are sized so that the outer diameter of the mechanical fan is less than the diameter of internal surface 112 of shroud 102, but greater than the difference between the diameter of internal surface 112 and the distance blade-contacting flange 114 extends inwardly towards longitudinal axis 106. As most clearly shown in FIG. 1B, the size of the outer diameter of mechanical fan 116 allows mechanical fan 116 to freely rotate about longitudinal axis 106 when mechanical fan 116 is disposed proximate to aft end 102b of shroud 102 and out of contact with blade-contacting flange 114. As most clearly shown in FIG. 2B, when mechanical fan 116 is translated to fore end 102a of shroud 102, the size of the outer diameter of mechanical fan 116 enables blades 118 to contact blade-contacting flange 114 causing concurrent rotation of mechanical fan 116 and shroud 102.

It should be noted that the blades are currently depicted in a simple rectangular shape. The blades however, may be angled, such that the width of the proximal end of each blade is angled with respect to the longitudinal axis of the drive shaft. In addition, or alternatively, the blades may include a corkscrew shape extending about the length of each blade.

The exemplary embodiment shown in FIGS. 1-2 includes a hollow drive shaft 105 sized to receive and translate along the length of shroud shaft 104. Moreover, drive shaft 105 is adapted to rotate with respect to shroud shaft 104. Drive shaft 105 and/or shroud shaft 104 may include bearings, or other similar friction reducing objects, materials, and/or fluids, disposed between the two shafts to reduce the friction between the two shafts during both rotation and translation of drive shaft 105 with respect to shroud shaft 104.

The rotation of drive shaft 105 is controlled via a rotational drive motor (not visible) disposed in motor housing 124. The rotational drive motor is adapted to rotate drive shaft 105 in both a clockwise and a counter-clockwise direction. The translation of drive shaft 105 along shroud shaft 104 is controlled via linear drive motor 126. Linear drive motor 126 enables the convertible ducted fan engine to translate between the fluid-propulsion configuration shown in FIG. 1 and the drive-wheel configuration shown in FIG. 2. Regardless of the configuration, linear drive motor 126 remains in communication with shroud shaft 104 to maintain control of the translation of mechanical fan 116.

Figure 3A:
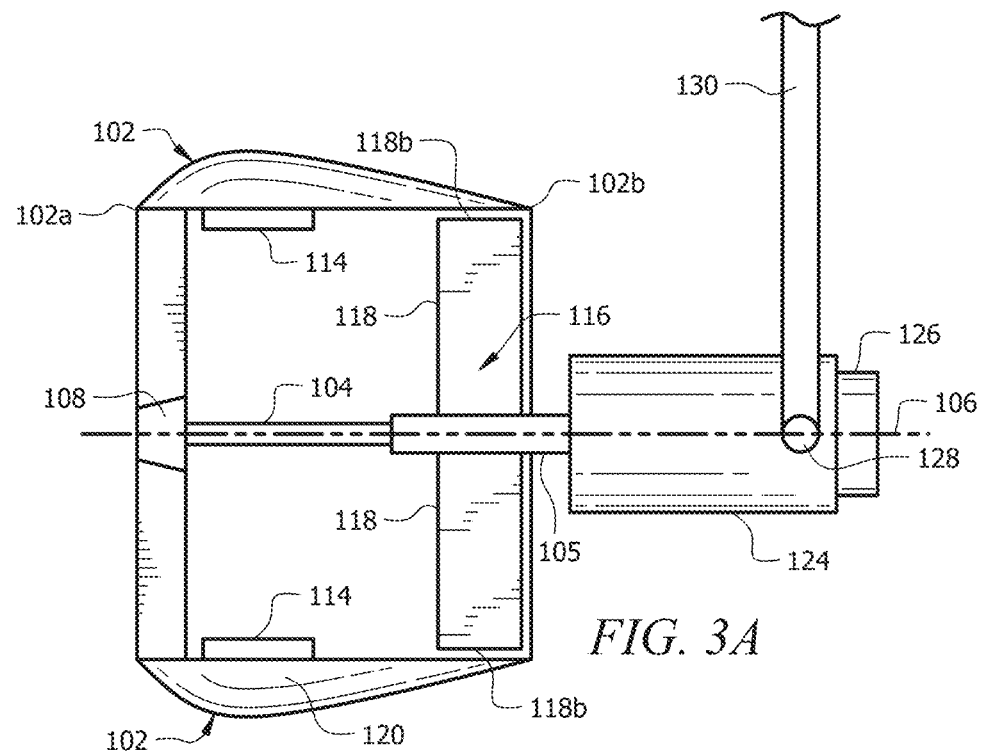
FIG. 3A is a profile view of an embodiment of the convertible ducted fan engine oriented vertically.
Figure 3B:
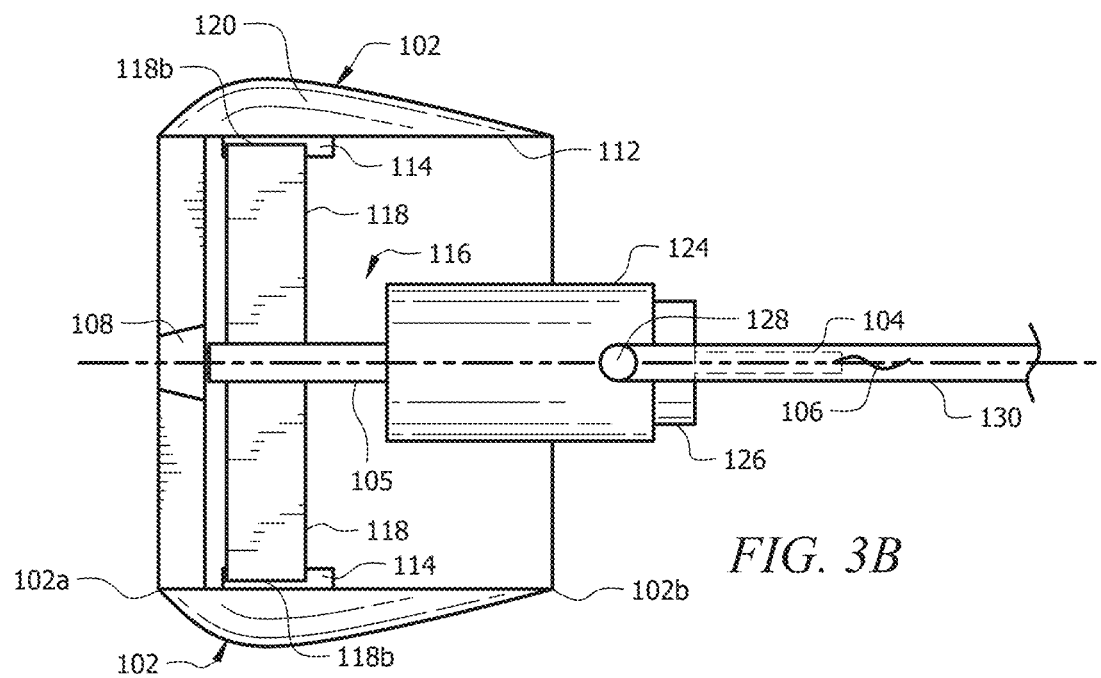
FIG. 3B is a profile view of the embodiment in FIG. 3A pivoted to a horizontal orientation.

Referring now to FIGS. 3, an embodiment of the convertible ducted fan engine includes mounting arm 130 pivotally connected to motor housing 124 through pivoting connection 128. Pivoting connection 128 is controlled by a motor and allows the convertible ducted fan engine to easily transition between different orientations. For example, the convertible ducted fan engine may be vertically oriented in the fluid-propulsion configuration as shown in FIG. 3A and can pivoted into a horizontal configuration when the convertible ducted fan engine is converted into the drive-wheel configuration as shown in FIG. 3B. The embodiment provided in FIG. 3 is a simplistic example of how the orientation of the convertible ducted fan engine can be altered. The number, shape, and complexity of mounting arm(s) 130 and pivoting connection(s) 128 is dependent on the vehicle powered by the convertible ducted fan engine(s) and the intended functional ability of that vehicle. A more complex embodiment of the pivoting convertible ducted fan engine may include one or more multidirectional pivoting connections 128 giving the convertible ducted fan engine 360° thrust vectoring and steering capabilities.

Referring now to FIGS. 4, an embodiment of the convertible ducted fan engine is adapted to translate the mechanical fan in a linear direction without relying on a shroud shaft. As depicted, said embodiment includes a hollow translation collar 132 sized to receive motor housing 124 within central bore 134. Translation collar 132 is at least partially located within shroud 102 and is concentrically secured with respect to shroud 102 through at least two radially extending supports 136 that span from the internal surface 112 of shroud 102 to outer surface 138 of translation collar 132. Translation collar 132 thus provides the slidable support through which motor housing 124 can translate.

Drive shaft 105 has a fixed length extending to blades 118. Thus, motor housing 124 is translated through translation collar 132 to bring blades 118 into and out of contact with blade-contacting flanges 114. Moreover, motor housing 124 is adapted to rotate with respect to translation collar 132. Translation collar 132 and/or motor housing 124 may include bearings, or other similar friction reducing objects, materials, and/or fluids, disposed between their respective contacting surfaces to reduce friction during both rotation and translation of motor housing 124 with respect to translation collar 132.

The rotation of drive shaft 105 is controlled via a rotational drive motor (not shown) disposed in motor housing 124. The rotational drive motor is adapted to rotate drive shaft 105 in both a clockwise and a counter-clockwise direction. The translation of motor housing 124 within translation collar 132 is controlled via linear drive motor 126. Linear drive motor 126 enables the convertible ducted fan engine to translate between the fluid-propulsion configuration shown in FIG. 4A and the drive-wheel configuration shown in FIG. 4B. As depicted, linear drive motor 126 engages mounting arm 130. Linear drive motor 126 may be any linear drive mechanism known to a person of ordinary skill in the art, including but not limited to mechanical gears and motors and electromagnetic mechanisms. In addition, an embodiment, such as the one depicted in FIG. 4B, may include the linear drive motor (not depicted to improve clarity) residing between the outer surface of motor housing 124 and the inner surface of translation collar 132 to drive motor housing 124. Linear drive motor 126 may also employ electromagnetic mechanisms that use magnetic fields to translate motor housing 124 between the fore and aft ends of translation collar 132.

Figure 4A:
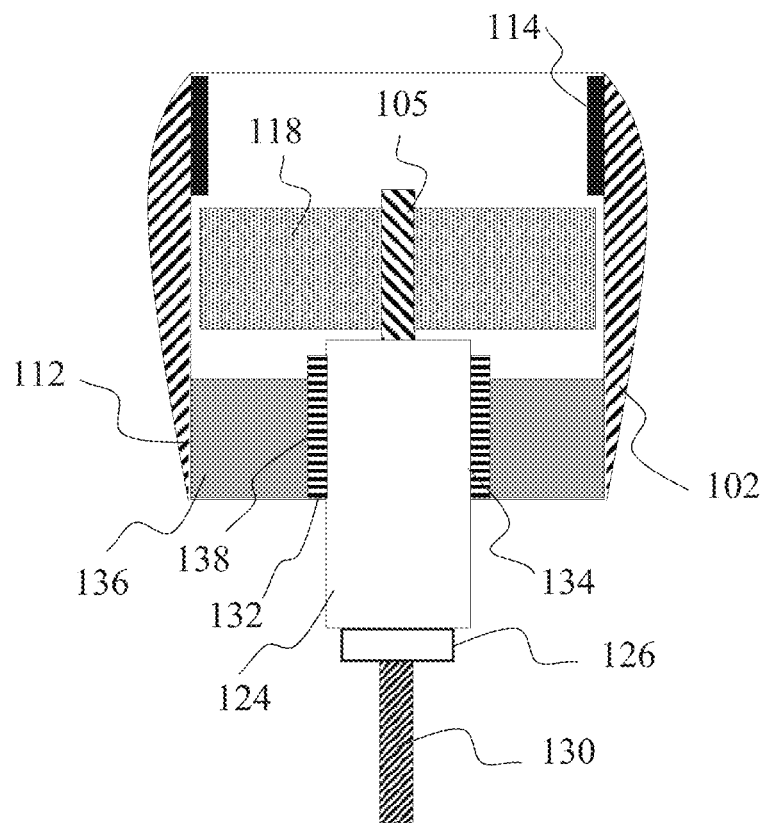
FIG. 4A is a top view of an embodiment of the present invention with an upper section of the shroud removed to view the internal area of the shroud.
Figure 4B:
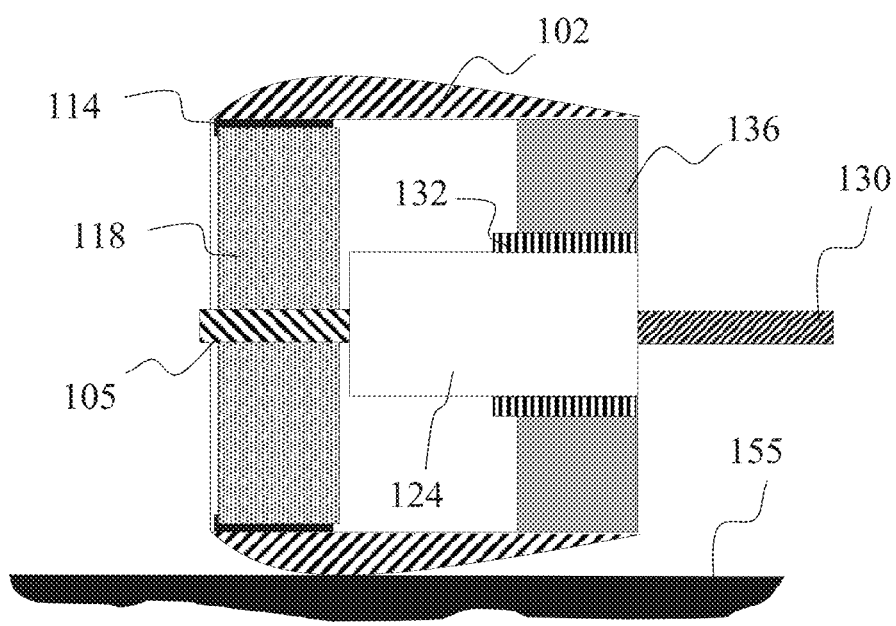
FIG. 4B is a top view of an embodiment of the present invention with an upper section of the shroud removed to view the internal area of the shroud.

As depicted in FIG. 4A, the engine is in a propulsion configuration. Blades 118 are free to rotate within shroud 102 to create thrust as is typical in a propulsion engine. In FIG. 4B, the engine has converted to the terrestrial wheel configuration in which blades 118 are in contact with blade-contacting flanges 114. The rotation of blades 118 cause shroud 102 to rotate and can thus drive an attached vehicle (as depicted in FIG. 7) over land. As previously explained, mounting arm 130 is preferably pivotally connected to the craft to alter the orientation of the engine with respect to the ground/craft.

Figure 5:
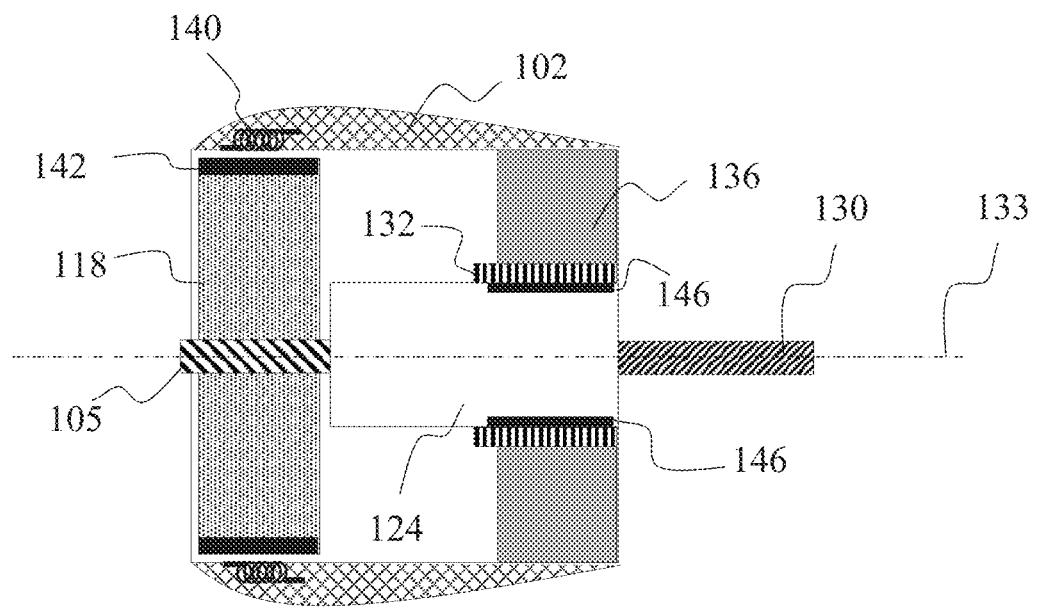
FIG. 5 is a top view of an embodiment of the present invention with an upper section of the shroud removed to view the internal area of the shroud.

In an embodiment, as depicted in FIG. 5, the blade-contacting flanges are replaced by electromagnetic components. Rather than a mechanical engagement between blades 118 and shroud 102, the embodiment relies on electromagnetic (EM) coils 140, magnetic elements 142, and a power source connected to coils 140. The power source may be secured on the craft to which mounting arm 130 is intended to attach. Wires connected to the power source pass through mounting arm 130 and connect to coils 140. By providing current to coils 140, the system can lock blades 118 relative to shroud 102 to prevent rotation of blades 118 within shroud 102. When blades 118 are locked with respect to shroud 102, actuation of the motor will cause both the blades and the shroud to rotate about motor housing 124. Thus, collar 132 is adapted to allow motor housing 124 to rotate within collar 132 so that the engine can operate as a wheel.

This embodiment also preferably includes clutch 146 disposed between the inner surface of collar 132 and the outer surface of motor housing 124. Clutch 146 is engaged to collar 132 and in turn shroud 102 when in the propulsion mode to prevent shroud 102 from rotating about axis 130 when blades 118 and their respective magnetic components 142 rotate with respect to coils 140 disposed within shroud 102. Clutch 146 is disengaged when the engine is operating in the wheel configuration to allow motor housing 124 to rotate within collar 132.

Figure 6:
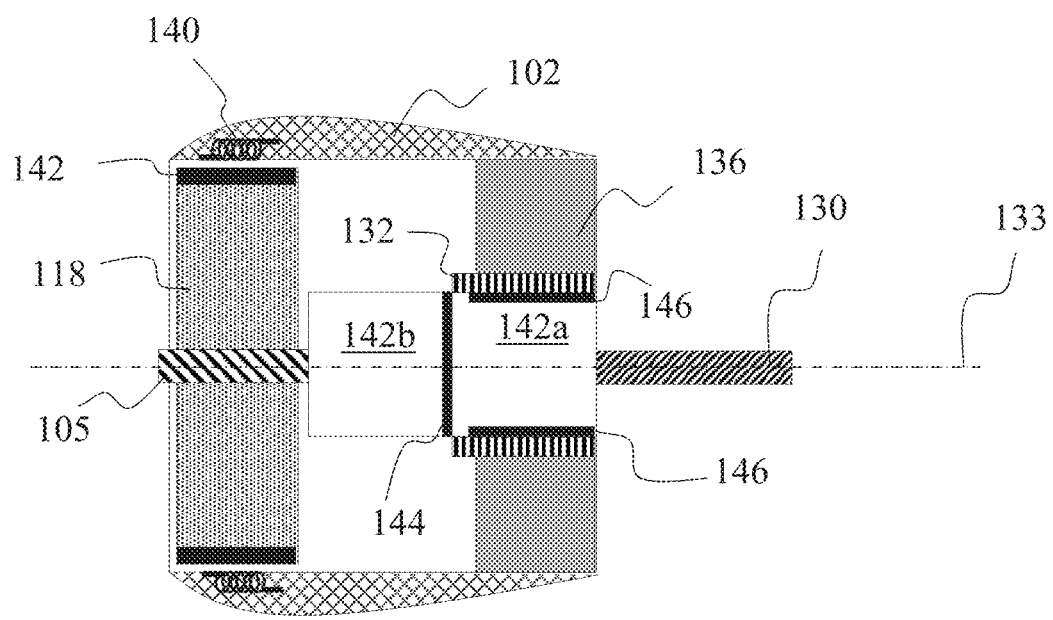
FIG. 6 is a top view of an embodiment of the present invention with an upper section of the shroud removed to view the internal area of the shroud.

Referring now to FIG. 6, an embodiment includes EM coils 140, magnetic elements 142, and a power source connected to coils 140 to create relative movement between shroud 102 and blades 118. The power source may be secured on a craft to which mounting arm 130 is intended to attach. Wires connected to the power source pass through mounting arm 130 and connect to coils 140. By providing current to coils 140, the system causes blades 118 to rotate relative to shroud 102. Effectively, the system is a deconstructed electric motor with the motors components split between the blades and the shroud.

As depicted in FIG. 6, EM coils 140 are disposed within or on an internal surface of shroud 102 and magnetic elements 142 are disposed on or in free ends 118b of blades 118. This embodiment can act as either a propeller and a terrestrial wheel. The method of actuation, however, is achieved by engaging/disengaging a pair of clutches 144, 146 and providing current to coils 140.

The depicted embodiment includes the motor housing simply acting as a main body, incorporating the clutch mechanisms. The main body is divided into proximal body 142a and distal body 124b with clutch 144 residing therebetween. Proximal body 124a resides at least partially within collar 132 and clutch 146 resides therebetween. Clutches 144 and 146 may be any clutches known to a person of ordinary skill in the art including mechanical, electrical, and electromagnetic clutches. Clutches 144 and 146 are also connected to a power source that preferably resides on the body of the craft to which mounting arm 130 is attached.

To operate as a propulsion engine, the clutches are adjusted to allow blades 118 to rotate within shroud 102 and shroud 102 is secured in a non-rotational state about axis 133. In operation as a propulsion engine, current is run through coils 140, which creates a magnetic field that drives magnetic components 142 on blades 118. Drive shaft 105 is fixedly secured to blades 118 and distal body 142b causing these components to rotate as a single body. Clutch 144 is disengaged allowing distal body 142b to rotate with respect to proximal body 142a. Clutch 146 is engaged to prevent rotation of collar 132, and in turn shroud 102, about proximal body 142a. Proximal body 142a is fixedly secured to mounting arm 130, so mounting arm 130, proximal body 142a, and shroud 102 do not rotate about axis 133, but blades 118 remain free to rotate within shroud 102 to produce thrust.

To operate as a wheel, clutch 144 is engaged so that blades 118, drive shaft 105, distal body 142b, proximal body 142a, and mounting arm 130 are rotationally fixed with respect to each other and thus do not rotate about axis 133 since mounting arm 130 is secured to a craft as depicted in FIG. 7. Clutch 146 is disengaged to allow collar 132, and in turn shroud 102, to rotate about axis 133. When current is supplied to coils 140, shroud 102 rotates relative to magnetic components 142 that are attached to the rotationally fixed blades 118. In other words, shroud 102 becomes a wheel that rotates about axis 133.

Figure 7A:
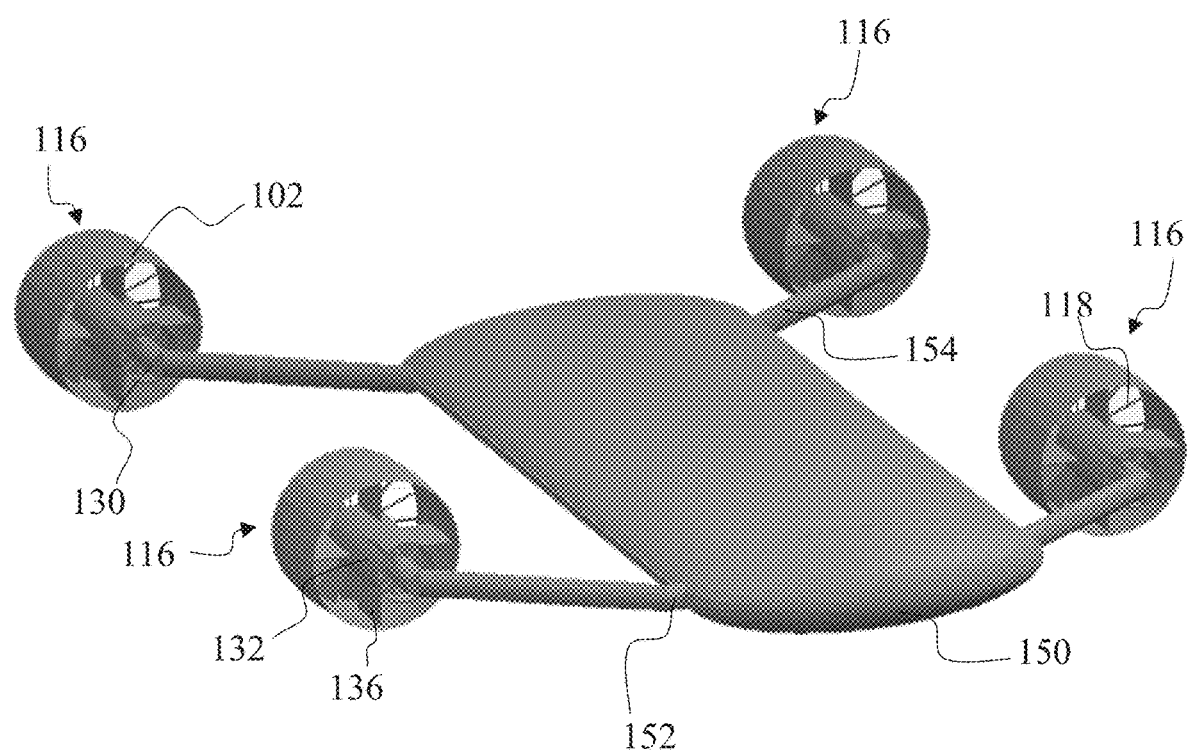
FIG. 7A is a perspective view of a craft having four convertible ducted engines in a forward thrust-driven configuration similar to that of a submersible.
Figure 7B:
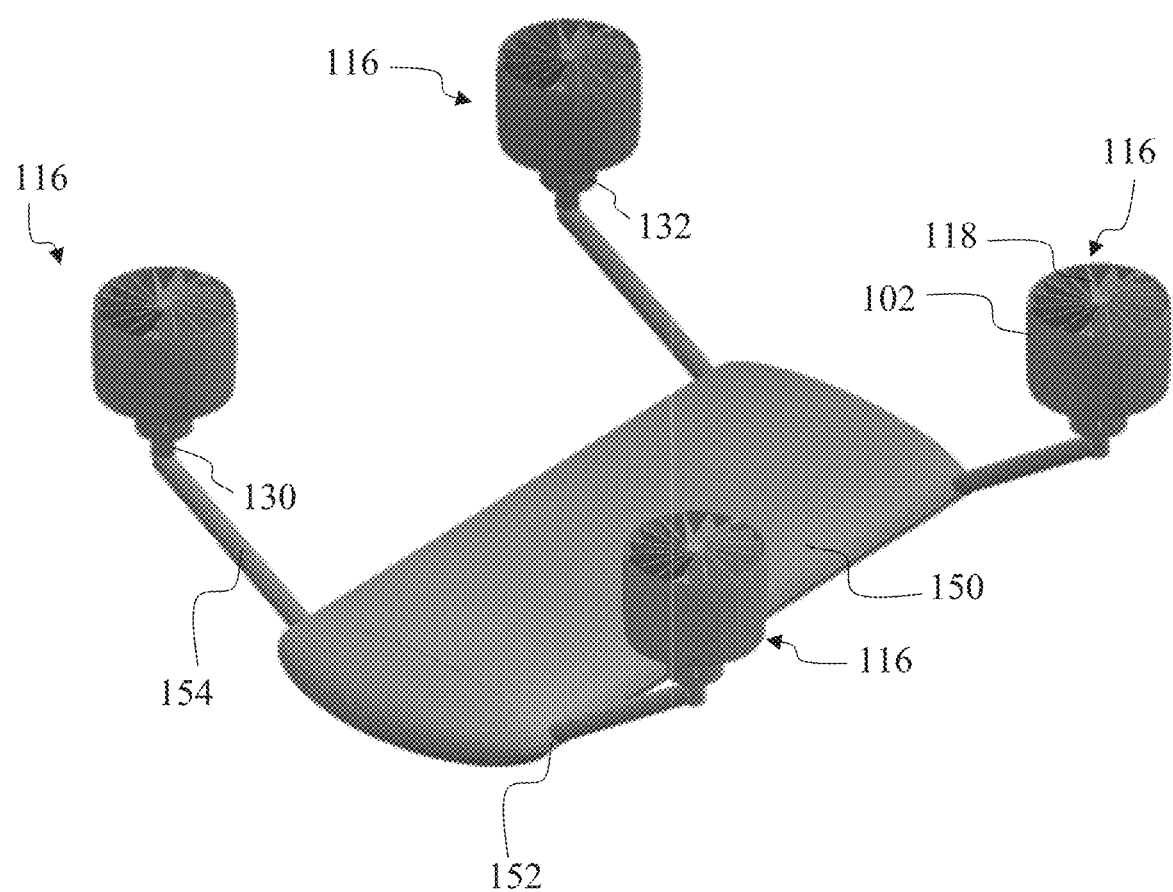
FIG. 7B is a perspective view of a craft having four convertible ducted engines in a vertical thrust-driven configuration similar to that of an aircraft.
Figure 7C:
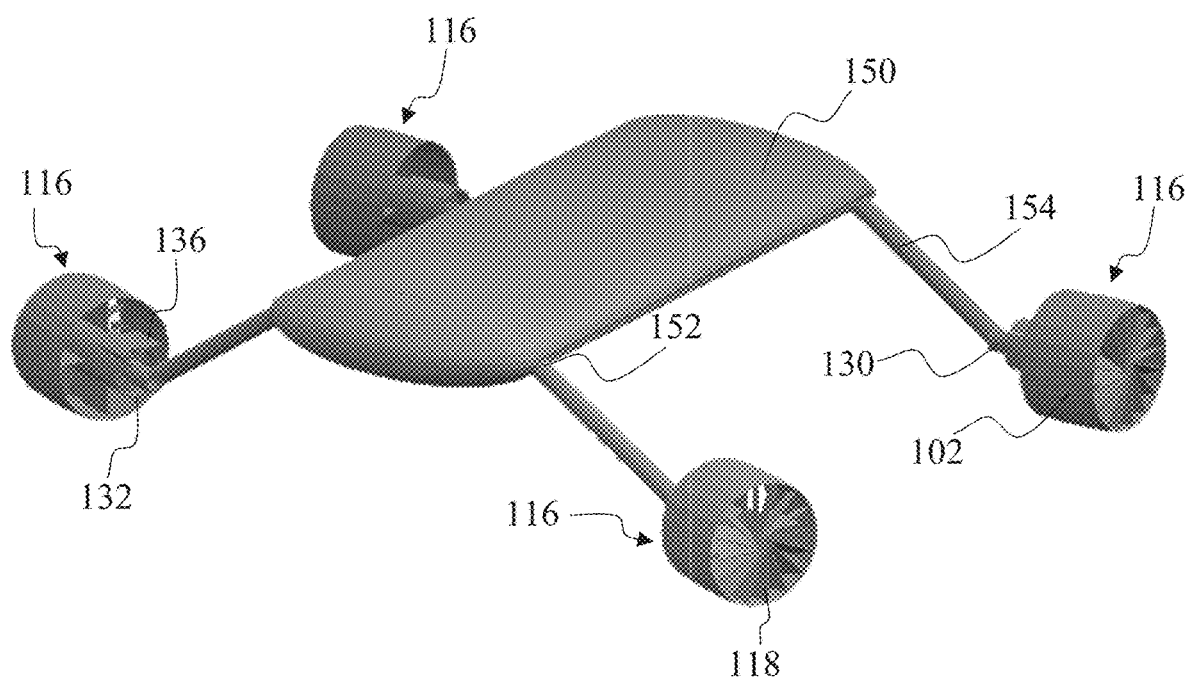
FIG. 7C is a perspective view of a craft having four convertible ducted engines in a drive-wheel configuration similar to that of a land vehicle.

Referring now to FIGS. 7, four engines 116 are secured to craft 150 via mounting arm 130 pivotally connected to extension arm 154 which is pivotally connected to body 150 or body extension arm 152. The pivotal connections allow the orientation of engines 116 to be individually manipulated. Accordingly, the craft can operate as a submersible as depicted in FIG. 7A, as a vertical takeoff/landing aircraft as depicted in FIG. 7B, and as a terrestrial wheel-drive vehicle as depicted in FIG. 7C.

While FIG. 7 depict four engines 116, certain crafts may operate with a single convertible engine or multiple convertible engines having pivotable connections to the body of the craft. Moreover, the craft may have a morphable body shape such as a hybrid dirigible to expand the mission capabilities of the craft.

Referring now to FIGS. 8, an embodiment of the convertible engine includes motor 115 having rotational body 117, motor mount 119, and drive shaft 105. Drive shaft 105 is connected to rotational body 117 and mechanical fan 116 in a manner such that all three rotate simultaneously. Motor mount 119 is secured to rotational body 117 in a rotationally free manner, such that rotational body 117 can rotate with respect to motor mount 119.

In an embodiment, motor 115 is an electrical motor with motor mount 119 having the permanent magnets and rotational body 117 housing the electrical coils. It is considered, however, that the permanent magnets could be housed in the rotational body while the electrical coils are secured in the motor mount. It is also considered that certain embodiments may use other non-electrical motors, such as a conventional gas powered motor.

The embodiment depicted in FIG. 8 further includes hollow translation collar 132 sized to receive mounting arm 130 within central bore 134. Translation collar 132 is preferably at least partially located within shroud 102 and is concentrically secured with respect to shroud 102 through preferably at least two radially extending supports 136 that span from the internal surface 112 of shroud 102 to outer surface 138 of translation collar 132. Translation collar 132 thus provides the slidable support through which mounting arm 130 can translate.

Distal end 132b of translation collar 132 includes motor mount engagement tabs 157, which are exemplarily shown as longitudinally extending teeth. Engagement tabs 157 are sized, shaped, and spaced to receive proximal end 119a of motor mount 119 and/or a mounting arm 130. Mounting arm 130, being slidably received by translation collar 132 and fixed to motor mount 119 via mounting plate 121, can pull motor mount 119 into engagement with translation collar 132 to prevent relative rotation between shroud 102 and motor mount 119.

Similar to other embodiments, shroud 102 also includes blade-contacting flange 114 extending inwardly from internal surface 112 towards longitudinal axis 106. Blade-contacting flange 114 extends inwardly a distance that is greater than the difference between the inner diameter of shroud 102 and the outer diameter of mechanical fan 116. As a result, blades 118 will contact blade-contacting flange 114 when mechanical fan 116 is translated towards blade-contacting flange 114 to bring the engine into the drive-wheel configuration.

As depicted in the exemplary embodiment, blade-contacting flange 114 is disposed proximate to fore end 102a of shroud 102. Blade-contacting flange 114, however, may be located anywhere along internal surface 112, such that blades 118 can contact blade-contacting flange 114 when mechanical fan 116 is moved into radial alignment with blade-contacting flange 114. In an embodiment, several blade-contacting flanges may be disposed on internal surface 112 to better secure mechanical fan 116 when the engine is in the drive-wheel configuration.

Figure 8B:
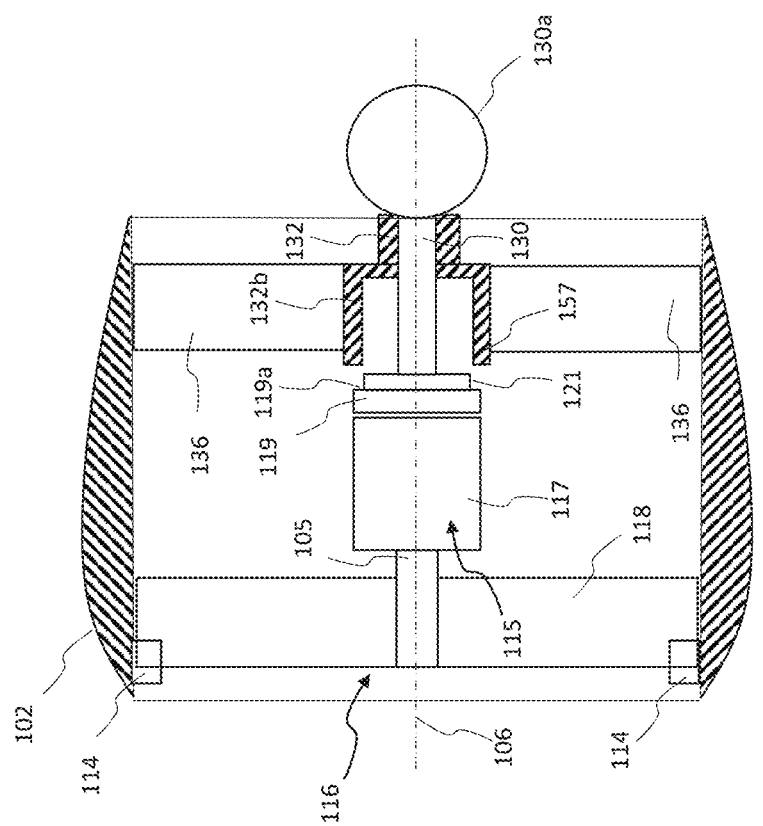
FIG. 8B is a sectional profile view depicting the embodiment of FIG. 8A in the drive-wheel configuration.
Figure 8A:
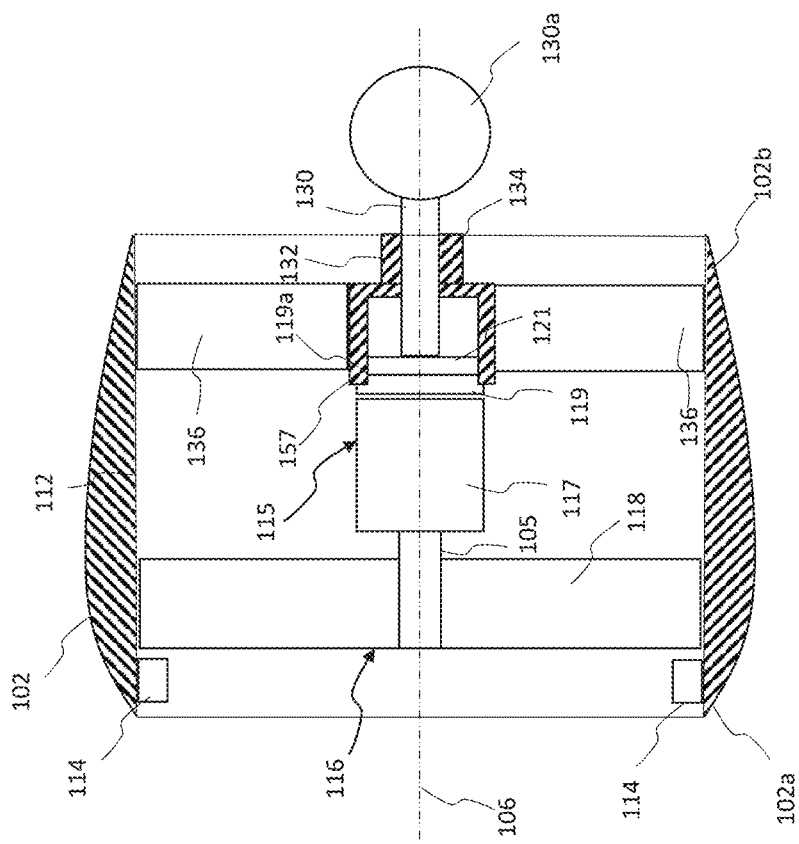
FIG. 8A is a sectional profile view depicting the internal components of an embodiment of the present invention when in the fluid propulsion configuration.

Internal surface 112 of the exemplary embodiment is preferably generally cylindrical in shape. A uniform cylindrical shape allows mechanical fan 116 to freely transition between the fore and aft ends 102a, 102b of shroud 102. Or in other words, mechanical fan 116 can easily move (1) into radial/transversal alignment with blade-contacting flanges 114 as shown in FIG. 8B, and (2) out of radial/transversal alignment with blade-contacting flanges 114 as shown in FIG. 8A. In an embodiment, the cross-section of internal surface 112 may be non-uniform along longitudinal axis 106 of shroud 102. A non-uniform cross-section may be used instead of one or more blade-contacting surfaces to establish concurrent rotation of the mechanical fan and the shroud. For example, the internal surface may be tapered at a certain location along the longitudinal axis of the shroud giving the tapered section an internal diameter that is equal to or slightly less than the outer diameter of the mechanical fan. Translation of the mechanical fan into the tapered section press-fits the mechanical fan into the tapered section to allow for concurrent rotation of the mechanical fan and the shroud. Alternatively, the tapered section may include a plurality of grooves to receive the blades, which has a similar functionality as the blade-contacting flange.

As depicted in the exemplary embodiment shown in FIGS. 8, shroud 102 has a length, extending about longitudinal axis 106, that is greater than the combined length of blade-contacting flange 114 and mechanical fan 116 in a longitudinal direction. The minimum length of shroud 102 is preferably at least the combined length of blade-contacting flange 114 and blades 118. An embodiment, however, may include a shroud not intended to fully house the mechanical fan when the convertible ducted fan engine is in the fluid-propulsion configuration. Such an embodiment may employ a shroud having a length less than the embodiment shown in the exemplary figures. Preferably, the length of the shroud at least matches the length of the mechanical fan.

An embodiment may rely on two or more clutches rather than the blade-contacting tabs and the engagement of the mount and the translation collar. A first clutch resides between the translation collar and the mount and a second clutch resides between the shroud and the mechanical fan, drive shaft, or rotating body of the motor. In an embodiment, there is a fore located collar 108 similar to the one shown in FIGS. 1-3. The second clutch resides between collar 108 and the mechanical fan. The propulsion configuration is achieved by engaging the first clutch to prevent rotation of the shroud with respect to the motor mount and disengaging the second clutch to allow the mechanical fan to rotate with respect to collar 108. The drive-wheel configuration is achieved by disengaging the first clutch to allow rotation of the shroud with respect to the motor mount and disengaging the second clutch to prevent the mechanical fan from rotating with respect to collar 108.

Figure 8D:
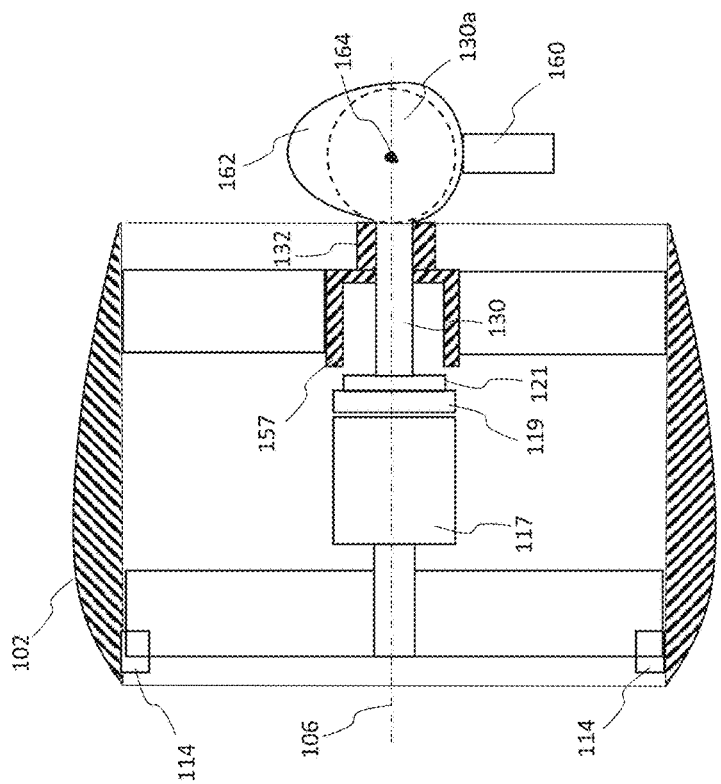
FIG. 8D is a sectional profile view depicting the embodiment of FIG. 8C in the drive-wheel configuration.
Figure 8C:
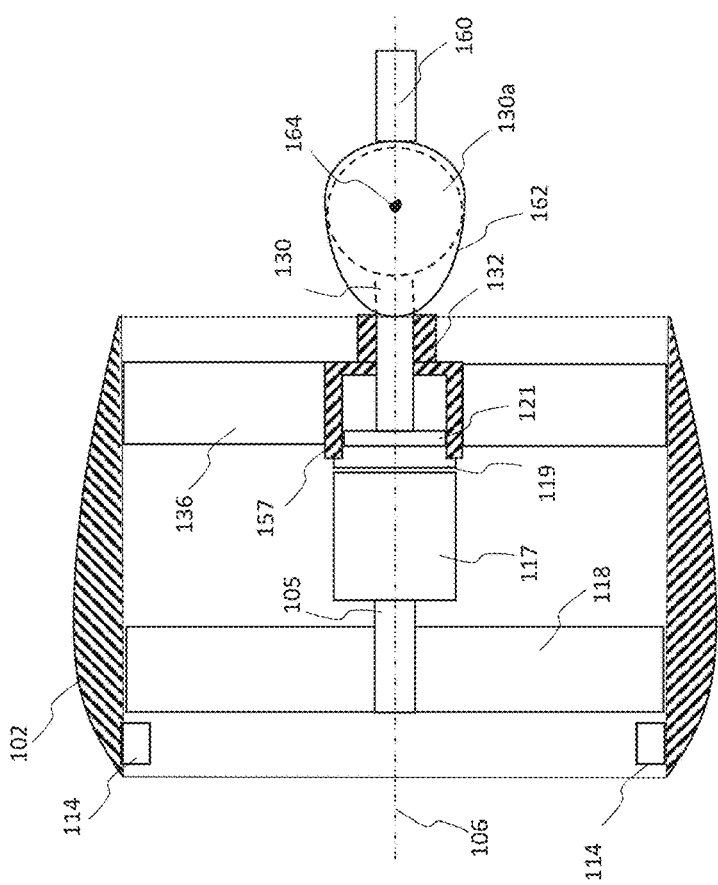
FIG. 8C is a sectional profile view depicting the internal components of an embodiment of the present invention when in the fluid propulsion configuration.

Referring now to FIGS. 8C and 8D, an embodiment of mounting arm 130 includes a rounded proximal end 130a coupled to articulating arm 160. Articulating arm 160 includes a non-circular distal end 162 or circular distal end having an offset axial engagement with proximal end 130a of mounting arm 130. As shown between FIGS. 8C and 8D, the rotation of articulating arm 160 causes distal end 162 to pivot about rotational axis 164 and causes linear actuation of mounting arm 130. In an embodiment, a biasing member, such as a spring resides between collar 132 and mounting plate 121 to help ensure translation of mounting arm 130.

In an embodiment, a linear drive motor translates mounting arm 130 through translation collar 132 to bring blades 118 into and out of contact with blade-contacting flanges 114. Translation collar 132 and/or mounting arm 130 may include translation gear assemblies between their respective contacting surfaces to allows for the translation of mounting arm 130 through translation collar 132. The linear drive motor may be any linear drive mechanism known to a person of ordinary skill in the art, including but not limited to mechanical gears, motors, and electromagnetic mechanisms.

As most clearly shown in FIGS. 8A and 8C, the size of the outer diameter of mechanical fan 116 allows mechanical fan 116 to freely rotate about longitudinal axis 106 when mechanical fan 116 is disposed proximate to aft end 102b of shroud 102 and out of contact with blade-contacting flanges 114. In addition, translation collar 132 engages motor mount 119 to prevent rotation of shroud 102 with respect to motor mount 119. As most clearly shown in FIGS. 8B and 8D, when mechanical fan 116 is translated to fore end 102a of shroud 102 and translation collar 132 disengages motor mount 119, mechanical fan 116 contacts blade-contacting flange 114 causing concurrent rotation of mechanical fan 116 and shroud 102.

Figure 9B:
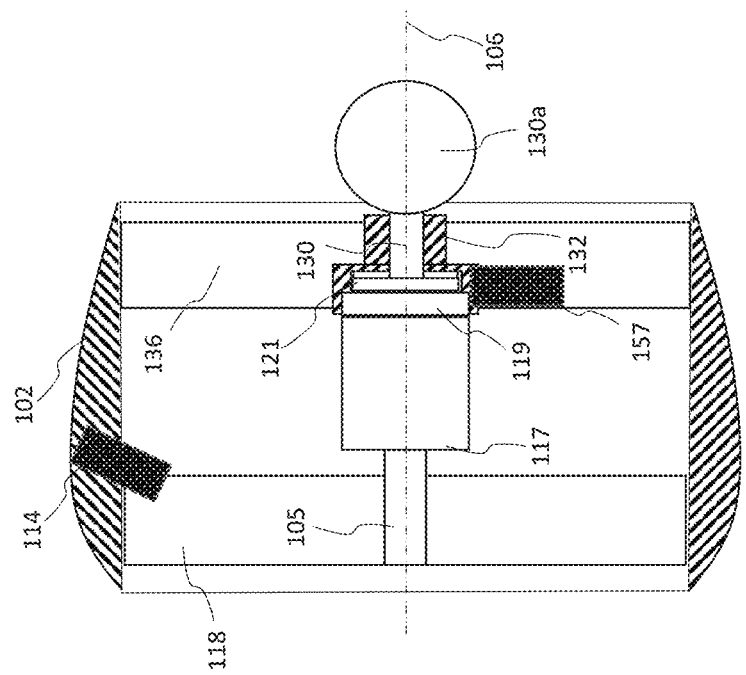
FIG. 9B is a sectional profile view depicting the embodiment of FIG. 9A in the drive-wheel configuration.
Figure 9A:
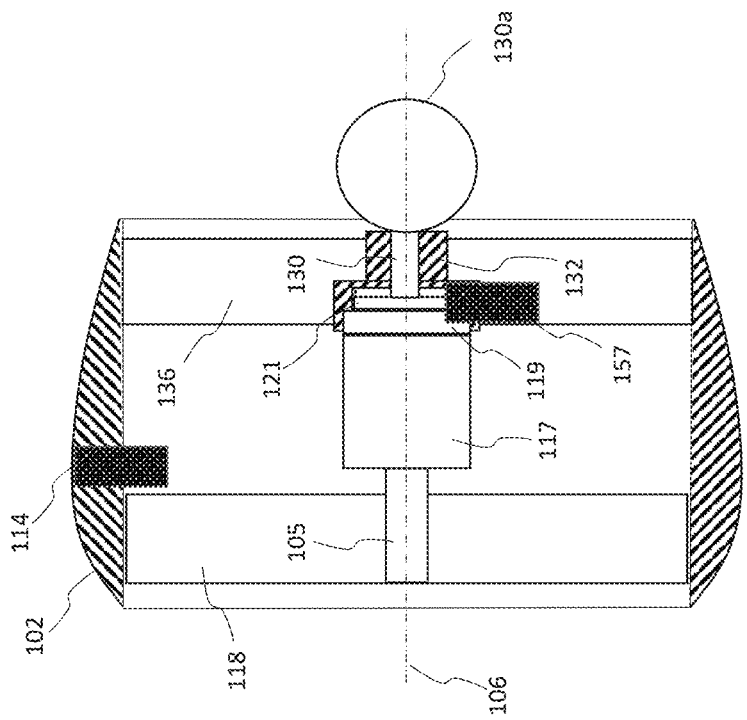
FIG. 9A is a sectional profile view depicting the internal components of an embodiment of the present invention when in the fluid propulsion configuration.
Figure 10A:
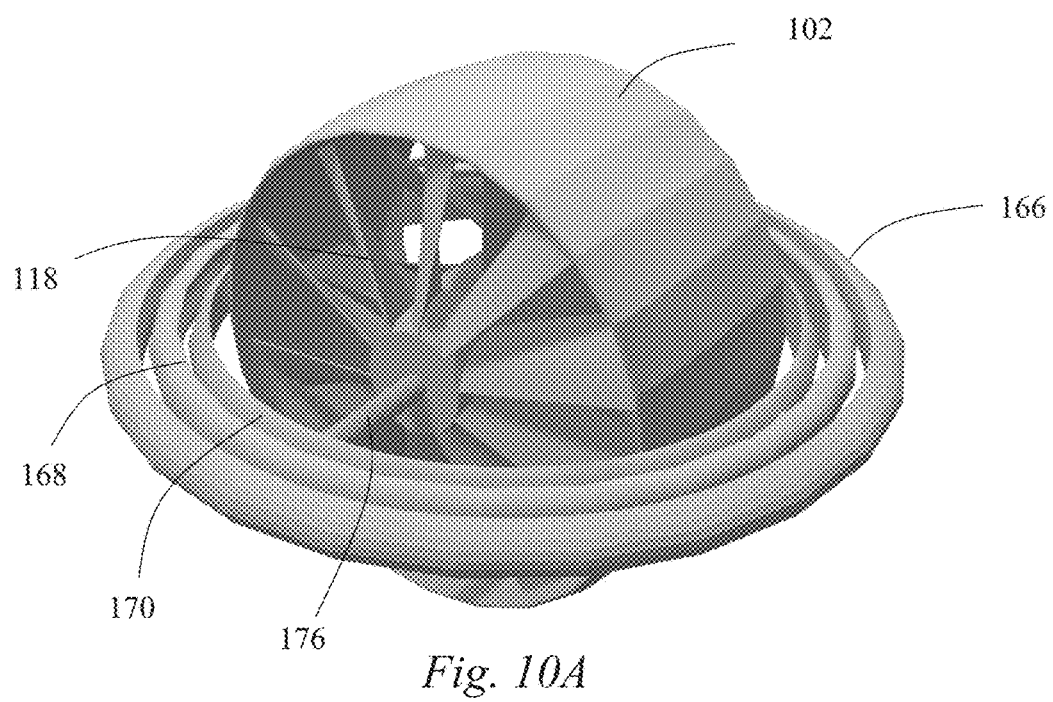
FIG. 10A is a perspective view of an embodiment of the mounting system with the engine shown in a drive-wheel configuration.
Figure 10B:
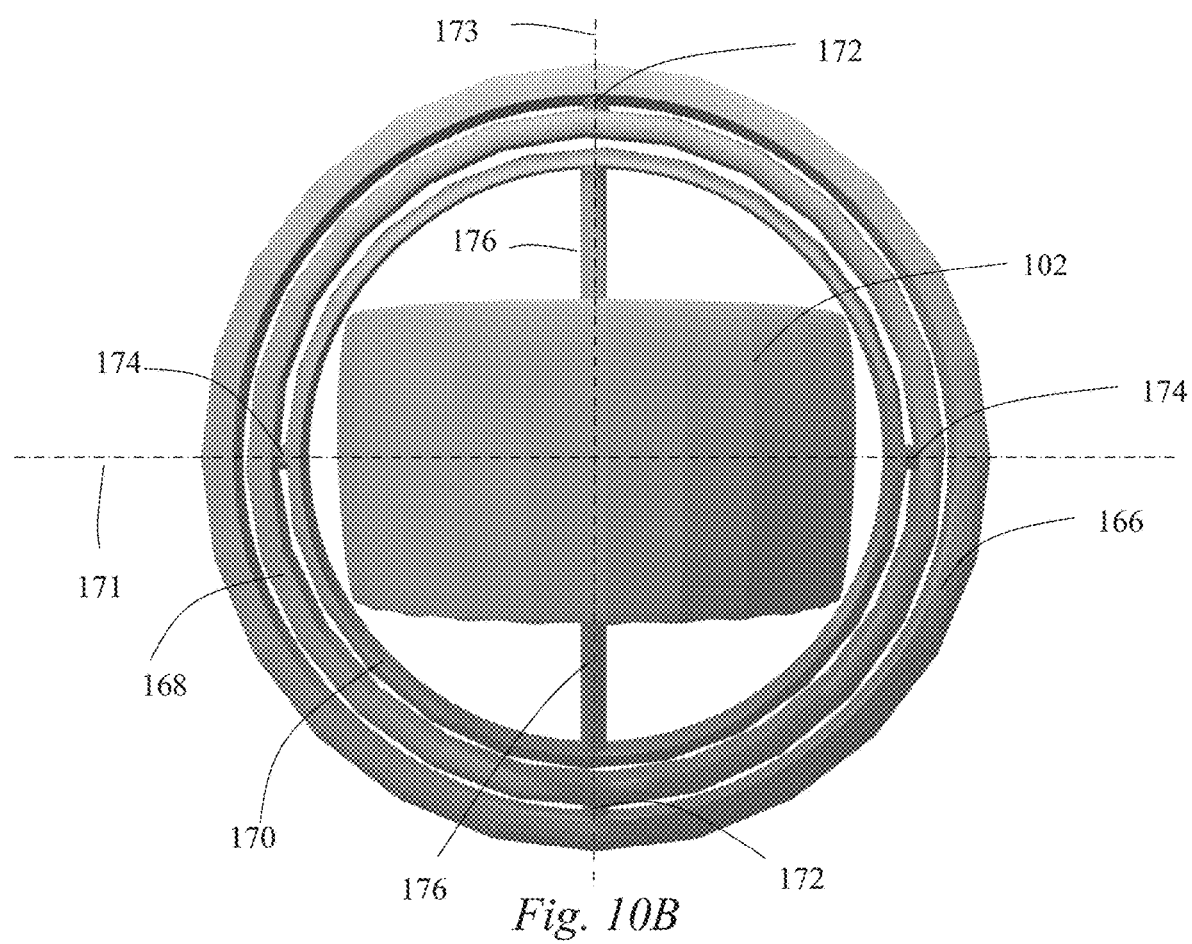
FIG. 10B is a top view of FIG. 10A.
Figure 10C:
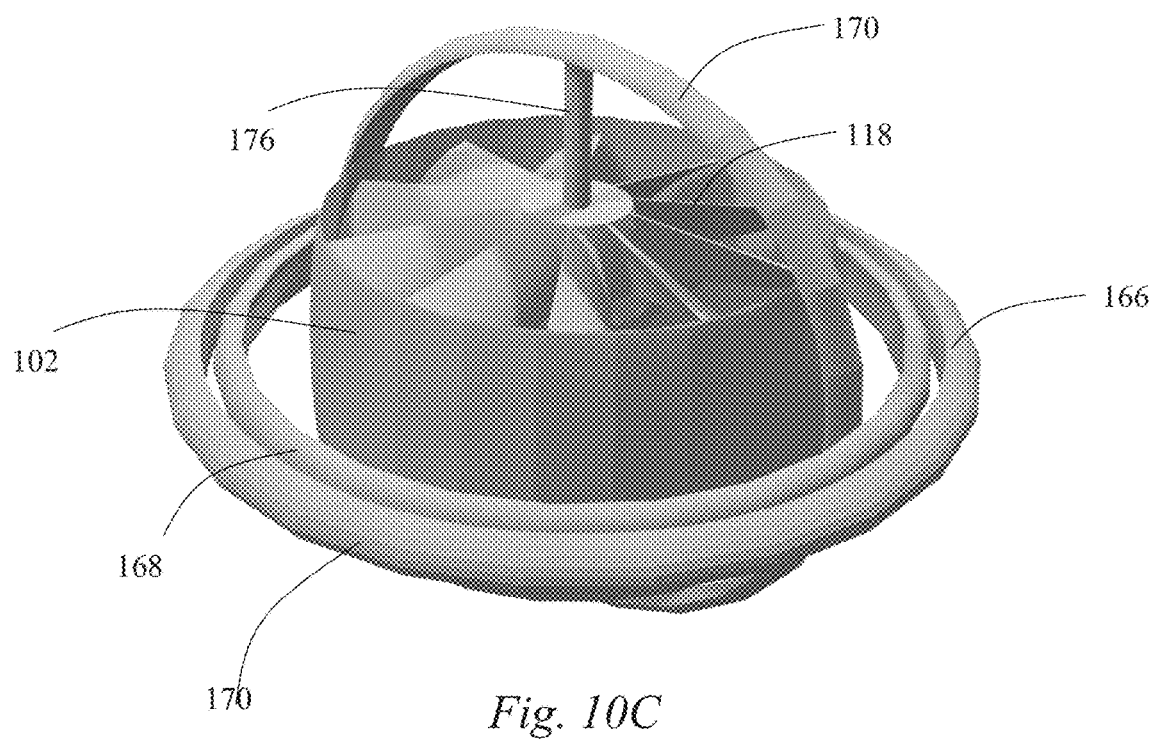
FIG. 10C is a perspective view of an embodiment of the mounting system with the engine shown in a vertical thrust orientation.
Figure 10D:
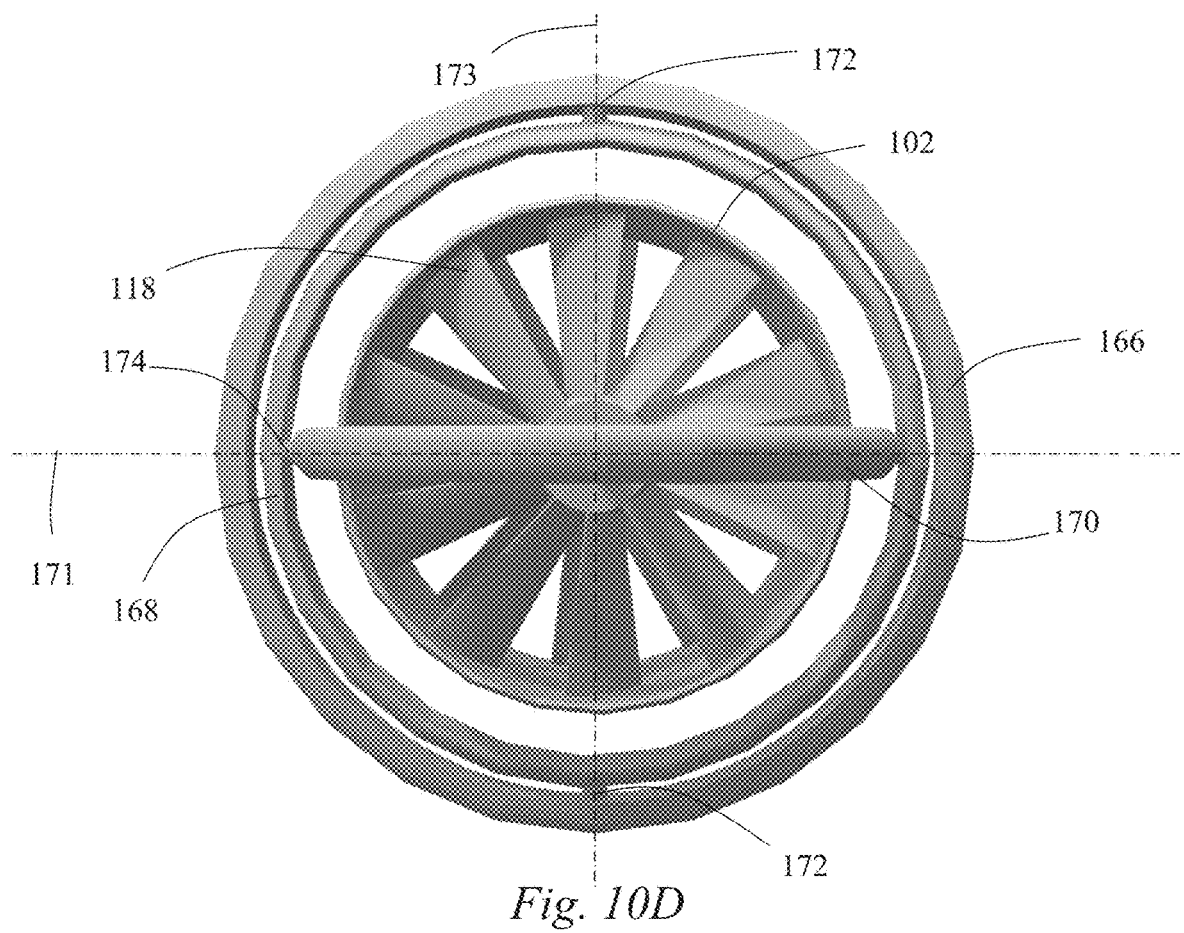
FIG. 10D is a top view of FIG. 10C.
Figure 10E:
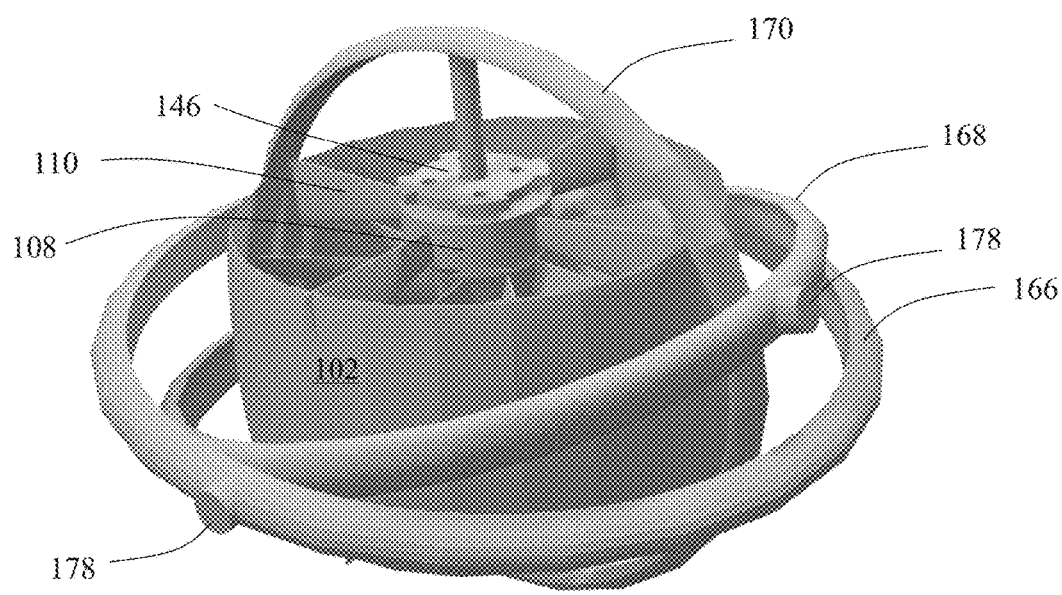
FIG. 10E is a perspective view of an embodiment of the mounting system with the engine shown in a thrust-vectoring orientation.
Figure 10F:
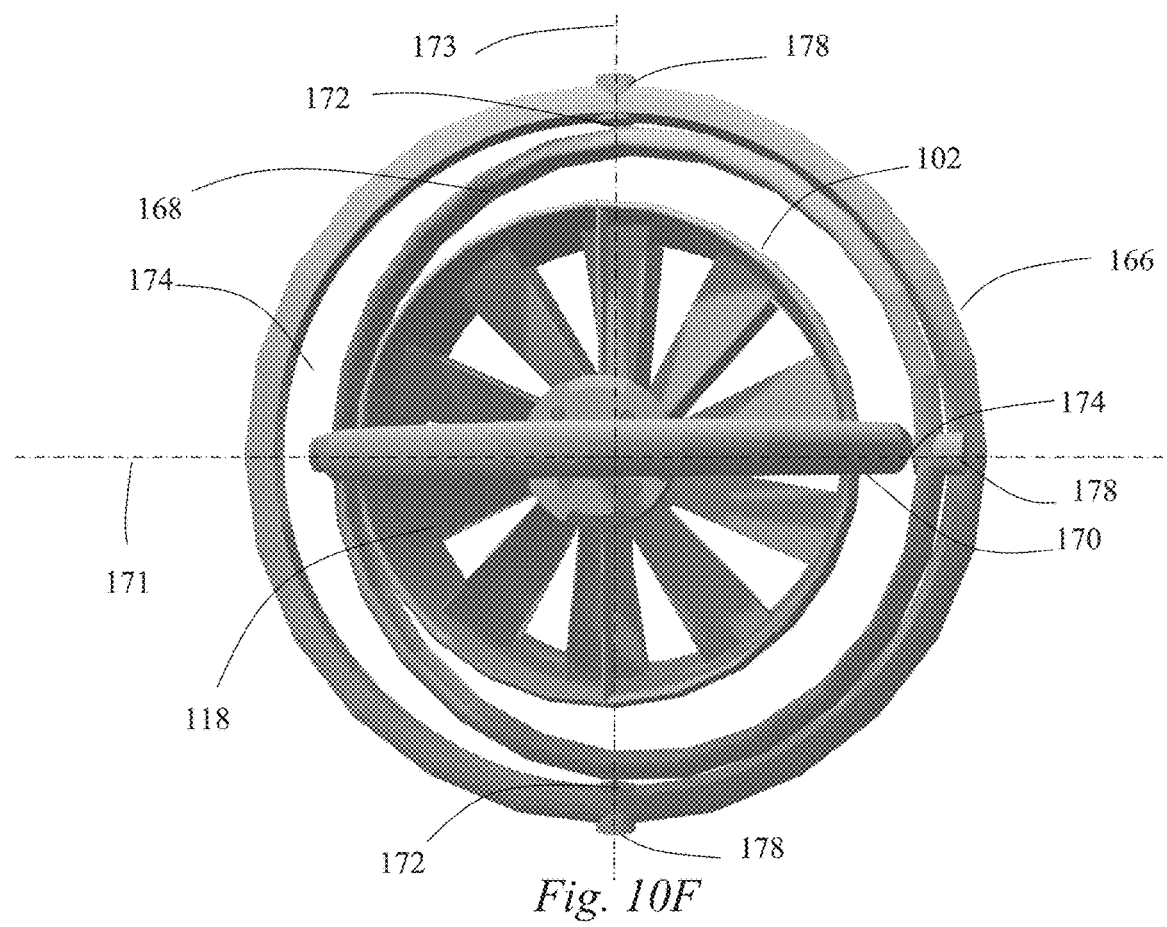
FIG. 10F is a top view of FIG. 10E.

Referring now to FIGS. 9, an embodiment of the convertible engine includes rotatable blade-contacting flanges 114. As shown in FIG. 9A, blade-contacting flanges 114 have a first orientation in which they are not in contact with blades 118. Blade-contacting flanges 114 can be rotated into a second orientation in which blade-contacting flanges 114 are in contact with blades 118. Alternatively, blade-contacting flanges 114 can be translated or telescoped inwardly to bring the blade-contacting flanges into an out of contact with blades 118. In such, embodiments, it is not necessary to translate the mechanical fan in the longitudinal direction. Instead, the blade-contacting flanges are moved. In an embodiment, the blade contacting flanges may be any structural component adapted to engage one or more of the blades, the rotating drive shaft, and/or the rotating body.

FIG. 9 also provide an exemplary alternative motor mount engagement tab 157 that is adapted to translate in a radial direction to engage motor mount 119 and/or mounting plate 121. An embodiment may also use telescoping tabs 157 designed to extend inwardly from the shroud to engage motor mount 119 and/or mounting plate 121. Motor mount 119 and/or mounting plate 121 include slots or other features for receiving tabs 157 thereby preventing rotation of motor mount 119 and/or mounting plate 121 with respect to shroud 102.

Motor mount engagement tabs 157 can be translated between an engaged orientation shown in FIG. 9A and a disengaged orientation shown in FIG. 9B. The translation of tabs 157 is achieved using any linear drive mechanism known to a person of ordinary skill in the art, including but not limited to mechanical gears, motors, and electromagnetic mechanisms.

As most clearly shown in FIG. 9A, mechanical fan 116 can freely rotate about longitudinal axis 106 when blade-contacting flange(s) 114 do not contact blades 118. In addition, motor mount engagement tab(s) 157 engages motor mount 119 to prevent rotation of shroud 102 with respect to motor mount 119. As most clearly shown in FIG. 9B, when blade-contacting flange(s) 114 contact blades 118 and motor mount engagement tab(s) 157 disengages motor mount 119, shroud 102 concurrently rotates with mechanical fan 116. In other words, the engine is adapted to operate in a typical propulsion mode (FIG. 9A) or in a drive-wheel mode (FIG. 9B).

Figure 18A:
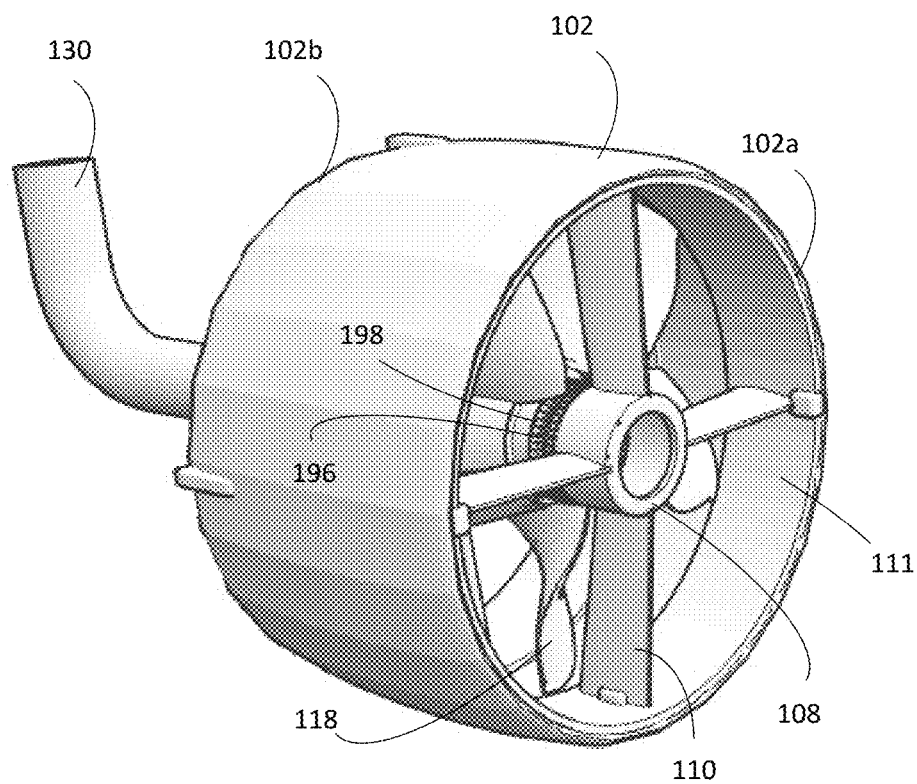
FIG. 18A is a perspective view of an embodiment of the convertible ducted fan engine.

Referring to FIGS. 18, an embodiment of the convertible ducted fan engine includes interlocking components between shroud collar 108 and a distal end of mechanical fan 116. Rather than distal radial ends 118b of blades 118 engaging shroud 102, central hub 113 of mechanical fan 116 engages shroud 102 through shroud collar 108. Engaging shroud 102 closer to the rotational axis of mechanical fan 116 reduces the stress on fan blades 118.

The exemplary depicted interlocking components 196 and 198 are in the form of interlocking teeth or crenellations that extend towards each other in a direction parallel to longitudinal/rotational axis 106. An embodiment may include the teeth oriented in a perpendicular direction with respect to the rotational axis of mechanical fan 116. It is considered that other embodiments may use other forms of complimentarily interlocking components known to a person of ordinary skill in the art to bring mechanical fan 116 into engagement with shroud 102 so that the two rotate as one.

Interlocking component 196 is disposed on a proximal end or proximally facing surface of collar 108 and interlocking component 198 is disposed on a distal end or distally facing surface of mechanical fan 116. More specifically, central hub 113 of mechanical fan 116 provides the structure on which interlocking component 198 is disposed. Alternatively, interlocking component 198 is disposed on a distal end or distally facing surface of rotational component 117 of motor 115 or rotational drive shaft 105.

Collar 108 resides proximate the fore end 102a of shroud 102 and is centrally aligned with longitudinal axis 106 (the rotational axis of mechanical fan 116). Collar 108 is fixed in place through supports 110, which extend radially to shroud mount 111 or to the internal surface of shroud 102 when shroud mount 111 is not used. Translation collar 132 resides proximate aft end 102b of shroud 102. Translation collar 132 is at least partially located within shroud 102 and is concentrically secured with respect to shroud 102 through at least two radially extending supports 136 that span from the outer surface of collar 132 to shroud mount 109 or to the internal surface of shroud 102 when shroud mount 109 is not used.

Translation collar 132 is sized to receive and house spring 123 and mounting plate 121 that is secured to mounting arm 130. In addition, a central bore permits passage of mounting arm 130 through translation collar 132 to engage mounting plate 121. Mounting arm 130 and spring 123 work in conjunction to translate mounting plate parallel to rotational axis 106. Translation collar 132 thus provides the slidable support through which mounting plate 121 can translate.

In an embodiment, rotational stopping member 131 extends from an aft end of translation collar 132. Rotational stopping member 131 is configured to engage mounting arm 130 and/or distal end 162 of articulating arm 160 to prevent rotation of translation collar 132 and in turn shroud 102 when the convertible ducted fan engine is in a fluid propulsion configuration. In an embodiment, rotational stopping member 131 engages a detent, a tab, or a flange attached to mounting arm 130, articulating arm 160 and/or distal end 162 when the convertible engine is in the fluid propulsion configuration to prevent rotation of translation collar 132 about rotational axis 106. The engagement of rotational stopping member 131 when the convertible engine is in the fluid propulsion configuration may be accomplished by any method or device known to a person of ordinary skill in the art.

As depicted, an embodiment of mounting arm 130 includes a rounded proximal end 130a rotationally coupled to articulating arm 160. Articulating arm 160 includes a non-circular distal end 162 or circular distal end having an offset axial engagement with proximal end 130a of mounting arm 130. The rotation of articulating arm 160 thus causes distal end 162 to pivot about rotational axis 164 and causes linear actuation of mounting arm 130.

In an embodiment, a linear drive motor translates mounting arm 130 through translation collar 132. Translation collar 132 and/or mounting arm 130 may include translation gear assemblies between their respective contacting surfaces to allows for the translation of mounting arm 130 through translation collar 132. The linear drive motor may be any linear drive mechanism known to a person of ordinary skill in the art, including but not limited to mechanical gears, motors, and electromagnetic mechanisms.

In some embodiments, both the system to prevent/allow the shroud rotation relative to the body of the aircraft for the fluid propulsion function and the system to couple/release the motor or motive force from the shroud, can be accomplished without translation of any components using electrical, electro-mechanical or mechanical clutches, such as those described in previous sections herein. This can be accomplished through a hybrid of translating and clutch means as well.

Mounting plate 121 is secured to motor mount 119. Motor mount 119 is secured to motor 115 comprised of non-rotational component 107 (often the stator in electrical motors) and rotational component 117 (often the rotor in electrical motors). Rotational component 117 is fixed to rotational drive shaft 105, which is in turn secured to mechanical fan 116. The rotation of drive shaft 105 is controlled via rotational drive motor 115. The rotational drive motor is adapted to rotate drive shaft 105 in both a clockwise and a counterclockwise direction.

Figure 18B:
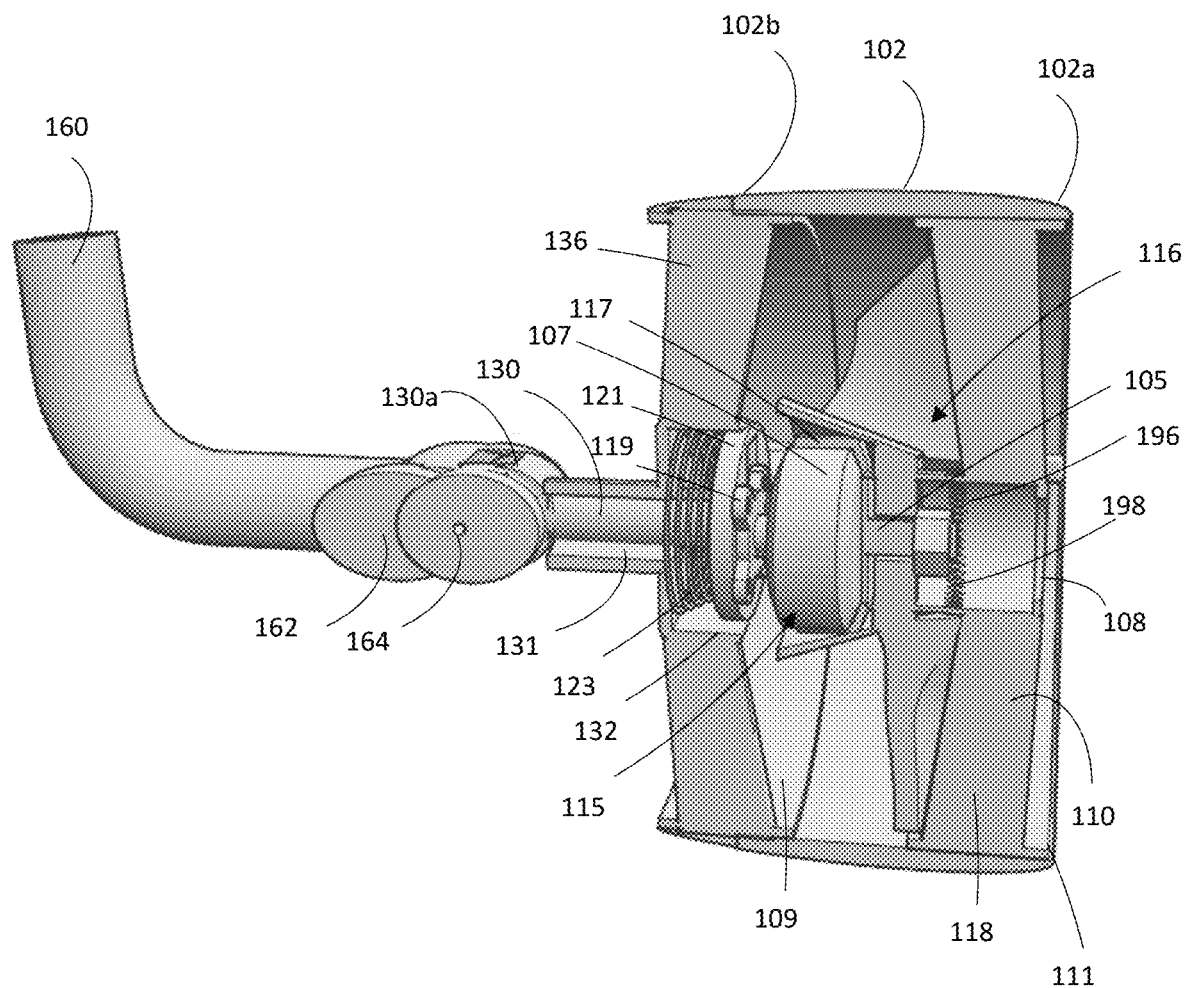
FIG. 18B is a section view of an embodiment of the convertible ducted fan engine in the drive-wheel configuration.

Thus, linear translation of mounting arm 130 causes mounting plate 121, motor mount 119, motor 115, and finally mechanical fan 116 to linearly translate. Through this translation, interlocking component 198 is moved into and out of engagement with interlocking component 196, or vice versa, to convert the convertible ducted fan engine between a fluid propulsion configuration (FIG. 18C) and a drive wheel configuration (FIG. 18B).

Figure 18C:
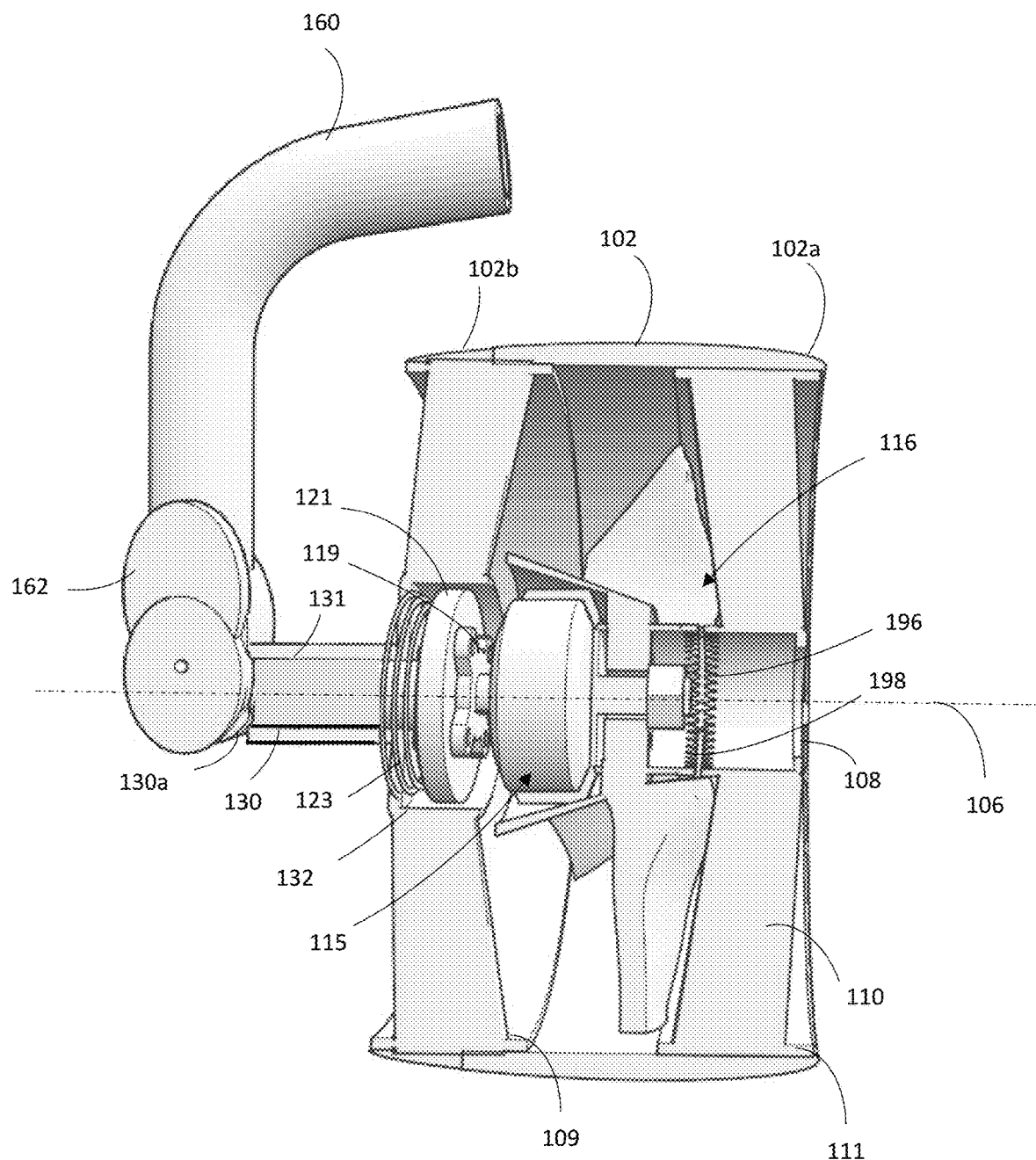
FIG. 18C is a section view of an embodiment of the convertible ducted fan engine in the fluid propulsion configuration.

As depicted in FIG. 18C, when the engine is in a propulsion configuration, blades 118 are free to rotate within shroud 102 to create thrust as is typical in a propulsion engine. In FIG. 18B, the engine is shown in the terrestrial drive wheel configuration in which interlocking component 198 on mechanical fan 116 is moved into engagement with interlocking component 196 on collar 108. The rotation of mechanical fan 116 causes shroud 102 to rotate and can thus drive an attached vehicle (as depicted in FIG. 7) over land. As previously explained, mounting arm 130 is preferably pivotally connected to the craft to alter the orientation of the engine with respect to the ground/craft.

Referring to FIGS. 19, an embodiment of the convertible ducted fan engine includes interlocking components between shroud 102's hollow translation collar 132 and an aft end of hub 113. As depicted, central hub 113 of mechanical fan 116 extends in an aft direction around motor 115 to allow interlocking component 198 to engage interlocking component 196 (disposed on collar 132) when the convertible ducted fan engine is converted into the drive wheel configuration.

The exemplary depicted interlocking components 196 and 198 are in the form of interlocking teeth or crenellations that extend towards each other in a direction parallel to rotational axis 106 of mechanical fan 116. An embodiment may include the teeth oriented in a perpendicular direction with respect to rotational axis 106. It is considered that other embodiments may use other forms of complimentarily interlocking components known to a person of ordinary skill in the art may be used to bring mechanical fan 116 into engagement with shroud 102 so that the two rotate as one.

Interlocking component 196 is disposed on a distal end or distally facing surface of collar 132 and interlocking component 198 is disposed on a proximal end or proximally facing surface of mechanical fan 116. More specifically, central hub 113 of mechanical fan 116 provides the structure on which interlocking component 198 is disposed. Alternatively, interlocking component 198 is disposed on a proximal end or proximally facing surface of rotational component 117 of motor 115.

Collar 132 resides proximate aft end 102b of shroud 102 and is centrally aligned with longitudinal/rotational axis 106. Collar 132 is fixed in place through supports 136, which extend radially to shroud mount 109 or to the internal surface of shroud 102 when shroud mount 109 is not used.

Translation collar 132 is sized to receive spring 123 and mounting plate 121. In addition, a central bore permits passage of mounting arm 130 through translation collar 132 to engage mounting plate 121. Mounting arm 130 and spring 123 work in conjunction to translate mounting plate 121 parallel to rotational axis 106. Translation collar 132 thus provides the slidable support through which mounting plate 121 can translate.

In an embodiment, rotational stopping member 131 extends from an aft end of translation collar 132. Rotational stopping member 131 is configured to engage mounting arm 130 and/or distal end 162 of articulating arm 160 to prevent rotation of translation collar 132 and in turn shroud 102 when the convertible ducted fan engine is in a fluid propulsion configuration. In an embodiment, rotational stopping member 131 engages a detent, a tab, or a flange attached to mounting arm 130, articulating arm 160 and/or distal end 162 when the convertible engine is in the fluid propulsion configuration to prevent rotation of translation collar 132 about rotational axis 106. The engagement of rotational stopping member 131 when the convertible engine is in the fluid propulsion configuration may be accomplished by any method or device known to a person of ordinary skill in the art.

As depicted, an embodiment of mounting arm 130 includes a rounded proximal end 130a rotationally coupled to articulating arm 160. Articulating arm 160 includes a non-circular distal end 162 or circular distal end having an offset axial engagement with proximal end 130a of mounting arm 130. The rotation of articulating arm 160 thus causes distal end 162 to pivot about rotational axis 164 and causes linear actuation of mounting arm 130.

In an embodiment, a linear drive motor translates mounting arm 130 through translation collar 132. Translation collar 132 and/or mounting arm 130 may include translation gear assemblies between their respective contacting surfaces to allows for the translation of mounting arm 130 through translation collar 132. The linear drive motor may be any linear drive mechanism known to a person of ordinary skill in the art, including but not limited to mechanical gears, motors, and electromagnetic mechanisms.

In some embodiments, both the system to prevent/allow the shroud rotation relative to the body of the aircraft for the fluid propulsion function and the system to couple/release the motor or motive force from the shroud, can be accomplished without translation of any components using electrical, electro-mechanical or mechanical clutches, such as those described in previous sections herein. This can be accomplished through a hybrid of translating and clutch means as well.

Mounting plate 121 is secured to mounting arm 130 and motor mount 119. Motor mount 119 is secured to motor 115, which is comprised of non-rotational component 107 (often the stator in electrical motors) and rotational component 117 (often the rotor in electrical motors). Rotational component 117 is fixed to rotational drive shaft 105, which is in turn secured to mechanical fan 116. The rotational drive motor 115 is adapted to rotate drive shaft 105 in both a clockwise and a counterclockwise direction, which in turn rotates mechanical fan 116.

Figure 19A:
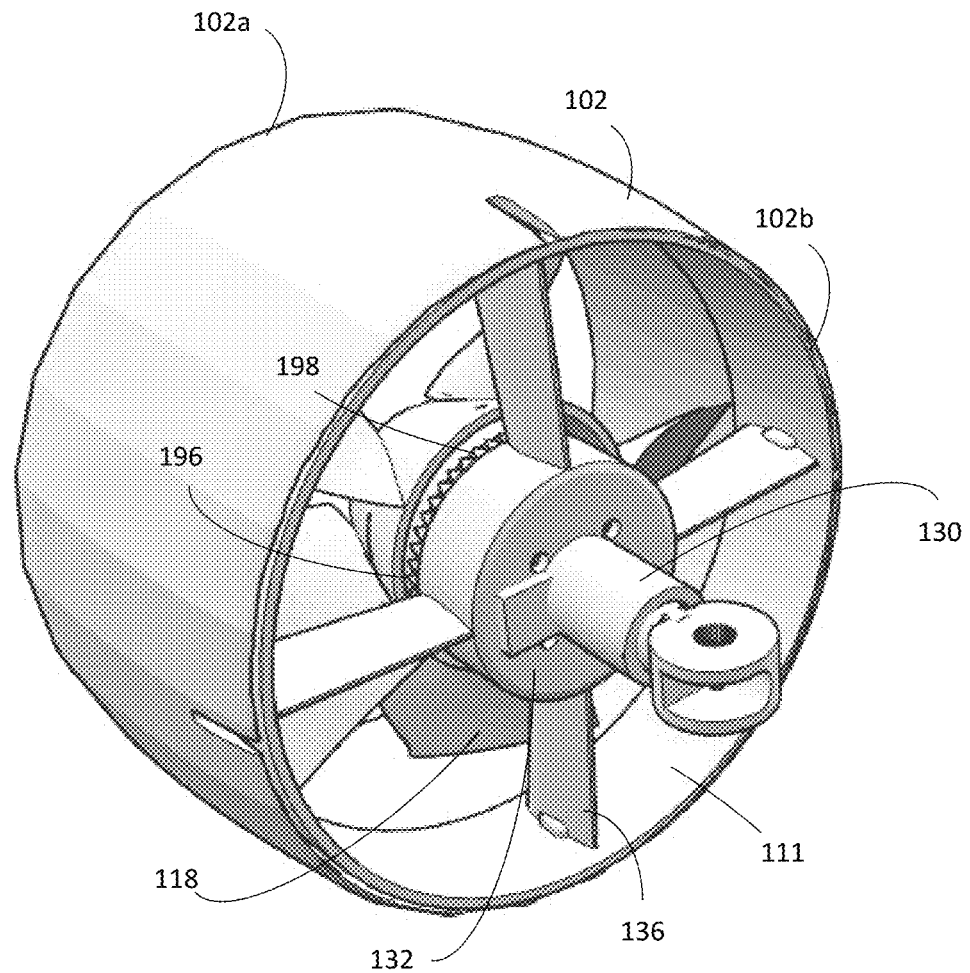
FIG. 19A is a perspective view of an embodiment of the convertible ducted fan engine.
Figure 19B:
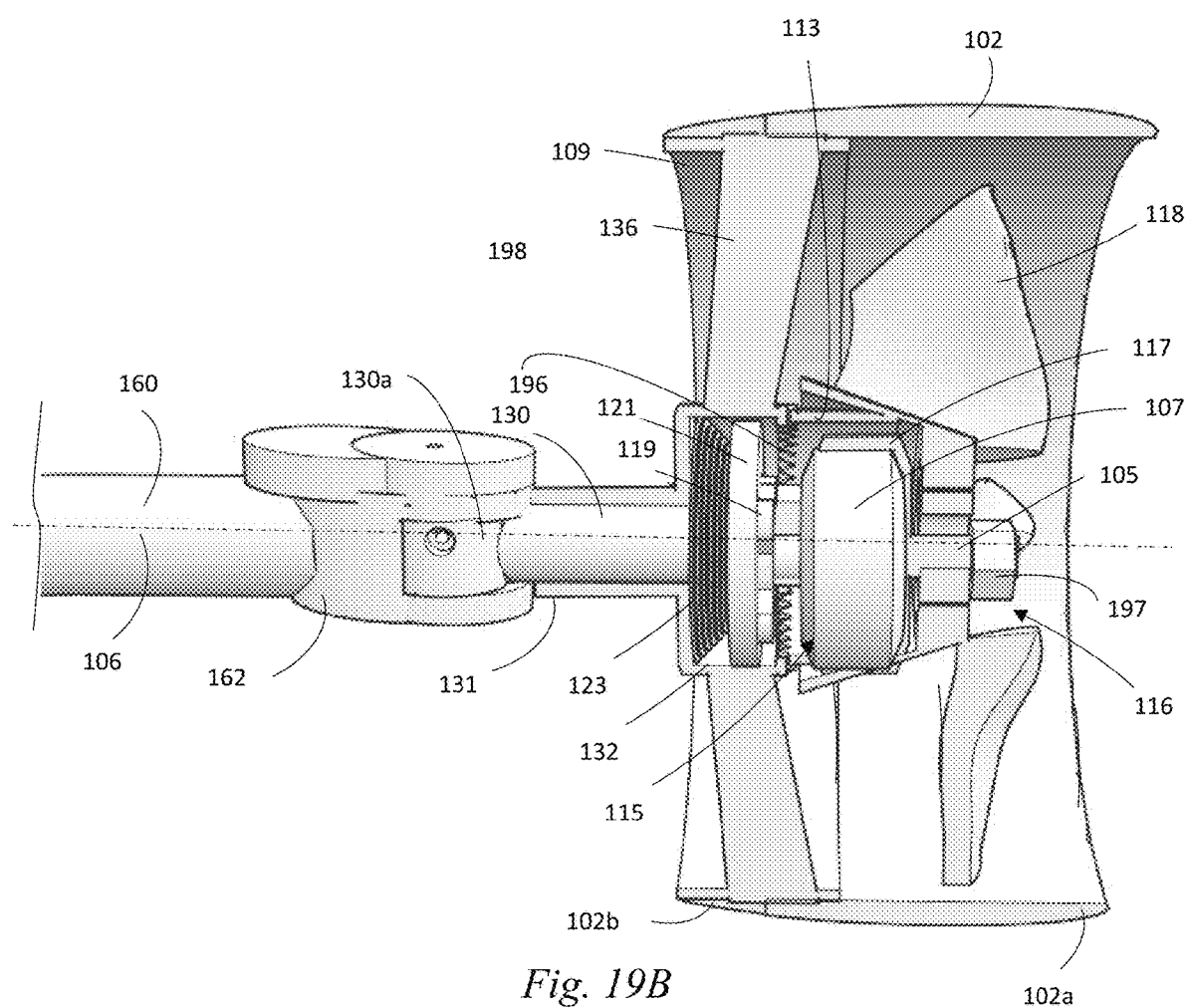
FIG. 19B is a section view of an embodiment of the convertible ducted fan engine in the drive-wheel configuration.

Thus, linear translation of mounting arm 130 causes mounting plate 121, motor mount 119, motor 115, and finally mechanical fan 116 to linearly translate. Through this translation, interlocking component 19 is moved into and out of engagement with interlocking component 196 or vice versa, to convert the convertible ducted fan engine between a fluid propulsion configuration (FIG. 19C) and a drive wheel configuration (FIG. 19B).

Figure 19C:
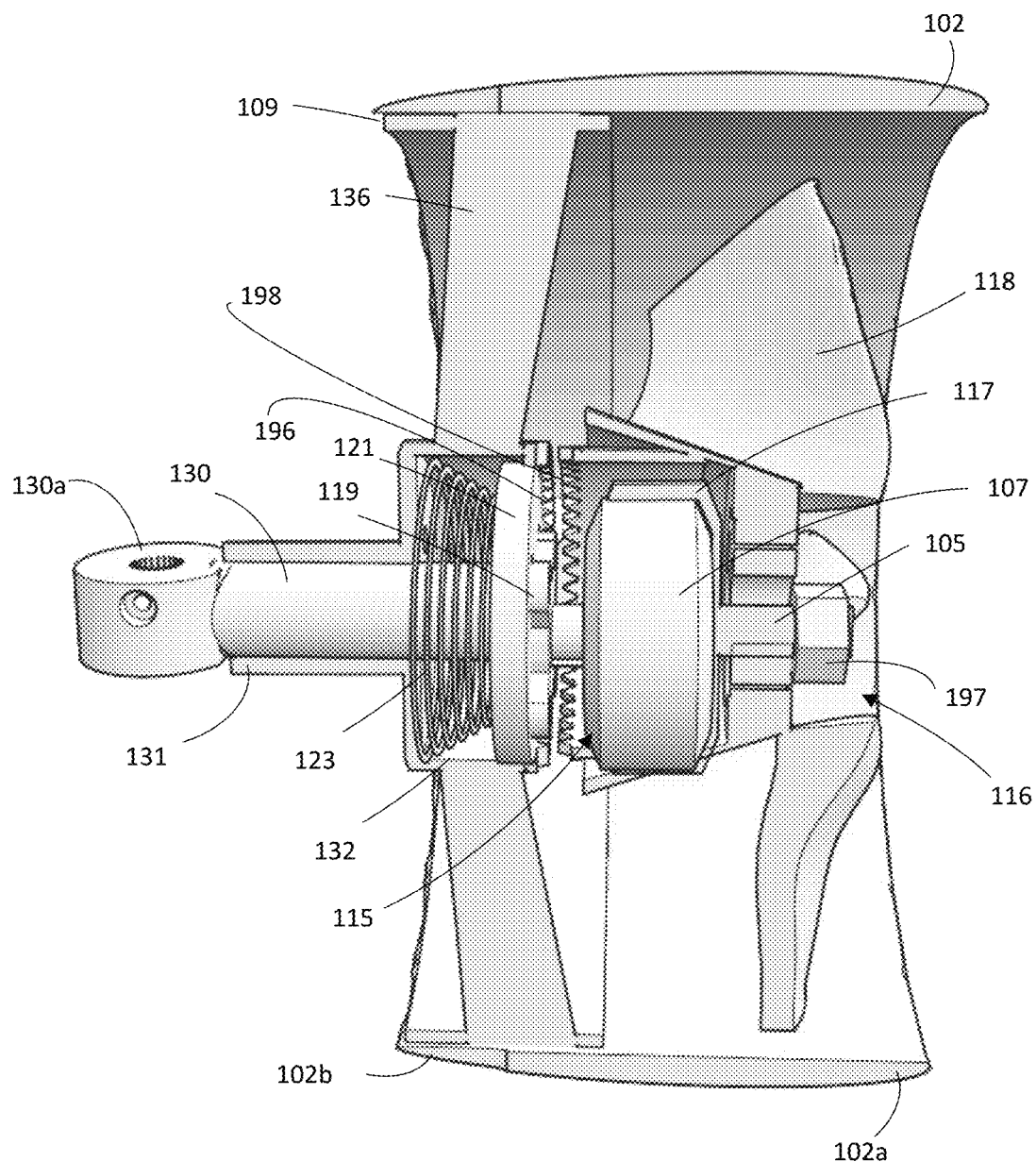
FIG. 19C is a section view of an embodiment of the convertible ducted fan engine in the fluid propulsion configuration.
Figure 19D:
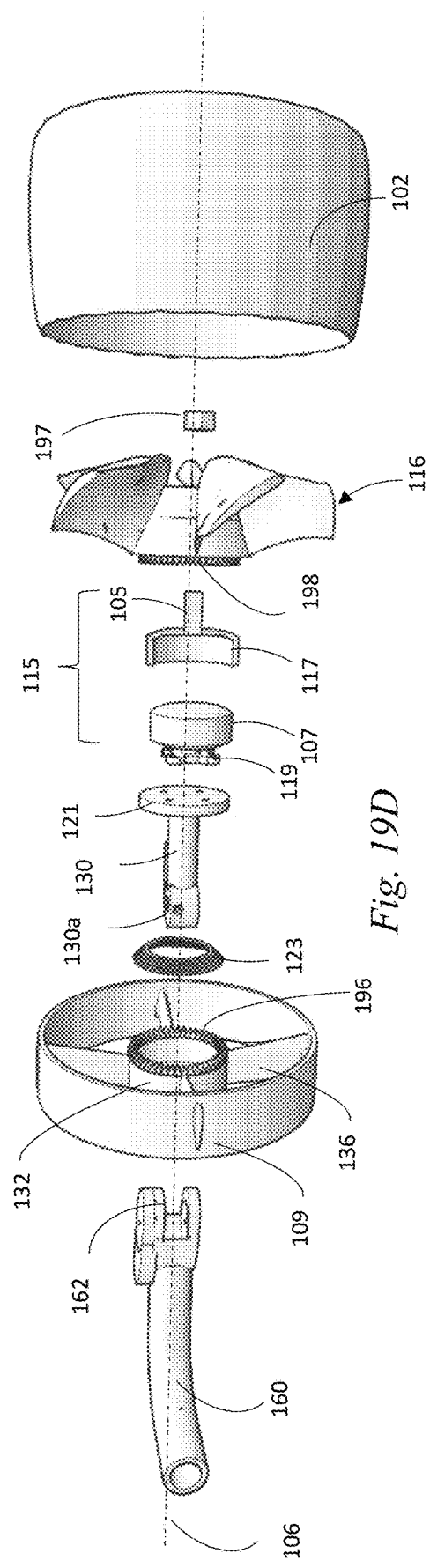
FIG. 19D is an exploded view of an embodiment of the convertible ducted fan engine.

As depicted in FIG. 19C, when the engine is in a propulsion configuration, blades 118 are free to rotate within shroud 102 to create thrust as is typical in a propulsion engine. In FIG. 19B, the engine is shown in the terrestrial drive wheel configuration in which interlocking component 198 on mechanical fan 116 is moved into engagement with interlocking component 196 on collar 132. The rotation of mechanical fan 116 causes shroud 102 to rotate and can thus drive an attached vehicle (as depicted in FIG. 7) over land. As previously explained, mounting arm 130 is preferably pivotally connected to the craft to alter the orientation of the engine with respect to the ground/craft.

In some embodiments, the motor is mounted to the translation collar and the two are free to linearly translate within the shroud as one. In such an embodiment, an additional spring platform would reside aft of the translation collar and the spring resides between the spring platform and the translation collar to aid in the translation of the mechanical fan into and out of contact with the shroud.

An embodiment may use any methods known to a person of ordinary skill in the art to convert the engine between (1) a propulsion configuration during which the mechanical fan rotates with respect to the shroud and (2) a drive-wheel configuration during which the shroud rotates when the mechanical fan rotates. Achieving this functionality may be accomplished through any singular or combined operation of mechanical (e.g. stops), electro-mechanical (e.g. actuated latches) or electrical (e.g. electromagnetic clutches or couplers) devices that facilitate both (1) the rotation of the shroud relative to the vehicle axle/body in the drive-wheel configuration, and (2) the rotation of the fan relative to a stationary shroud in the fluid propulsion configuration.

Gyroscopic Mounting System

Referring now to FIGS. 10-17, an embodiment of the convertible engine is mounted on a gyroscopic mounting system. The gyroscopic mounting system moves the engine into the correct orientation required for all modes of operation and also moves the engine into specific orientations for thrust vectoring and attitude control. The mounting system is in communication with a wired or wireless controller configured to steer/move the engine into specific orientations and maintain a specific orientation as needed. The controller may be any manual or automatic system known to a person of ordinary skill in the art.

The gyroscopic mounting system has a set of gimbal rings 166, 168, 170 that work together to adjust the orientation of the centrally mounted ducted fan engine 100. Ducted fan engine 100 may be any convertible engine described above or any other version adapted to operate as both a wheel and a thrust-producing fan/propeller. In operation as a thrust propeller, the fan/propeller is free to rotate with respect to the shroud. When operating as a wheel, the propeller is coupled (electrically, magnetically, and/or mechanically) to the shroud, such that the shroud acts as a drive-wheel when in contact with a surface. The operation of the engine can be controlled via any control system known to a person of ordinary skill in the art. An embodiment may include multiple propellers and/or independent power sources for each motor, which will be explained in greater detail below.

As most clearly shown in FIGS. 10, an embodiment of the mounting system includes three gimbals: inner gimbal 170, middle gimbal 168, and outer gimbal 166. Inner gimbal 170 encircles the convertible engine, and middle gimbal 168 encircles inner gimbal 170. Middle gimbal 168 is connected to inner gimbal 170 via pivot pins 174, such that inner gimbal 170 can rotate within middle gimbal 168 about first rotational axis 171 that passes through pivot pins 174. Likewise, outer gimbal 166 is connected to middle gimbal 168 via pivot pins 172, such that middle gimbal 168 can rotate within outer gimbal 166 about second rotational axis 173 that passes through pivot pins 172. First rotational axis 171 is perpendicular to second rotational axis 173; however, it is considered that an embodiment may include the first and second rotational axes being arranged in such a manner that they are not parallel or perpendicular to each other, but have an offset angle between 0 and 180 degrees.

Figure 16A:
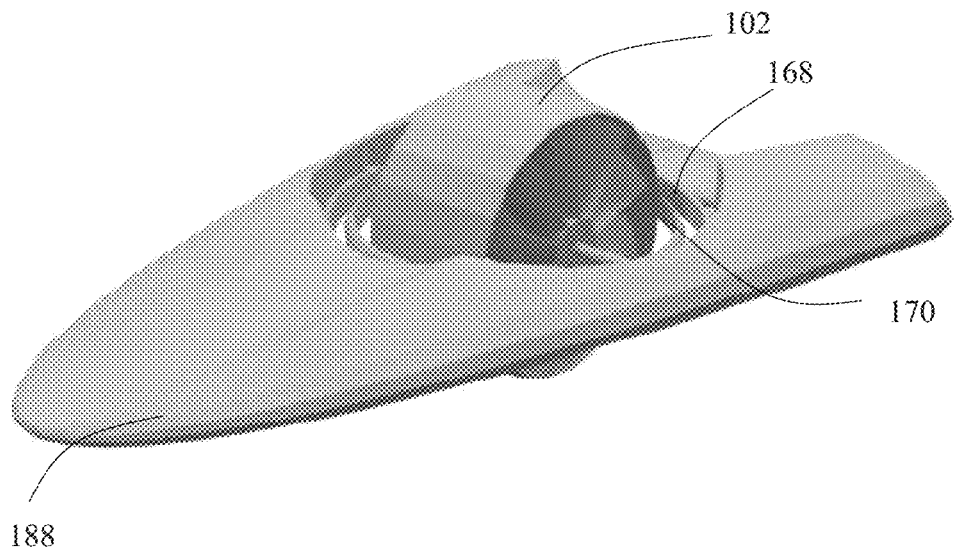
FIG. 16A is a perspective view of an embodiment of the mounting system secured to a craft having a single convertible engine with the engine shown in a drive-wheel configuration.
Figure 16B:
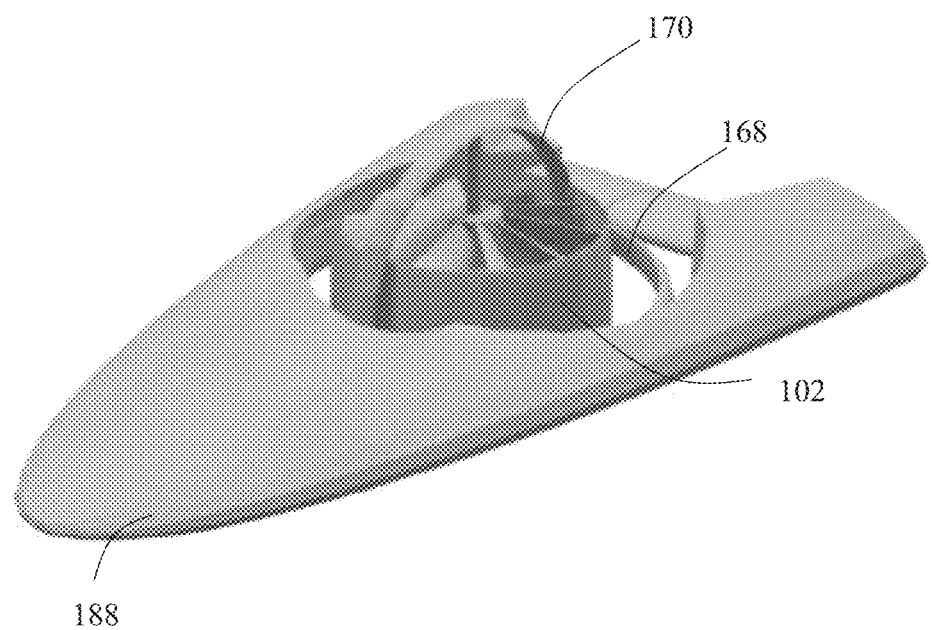
FIG. 16B is a perspective view of an embodiment of the mounting system secured to a craft having a single convertible engine with the engine shown in a vertical takeoff and landing (VTOL) orientation.
Figure 16C:
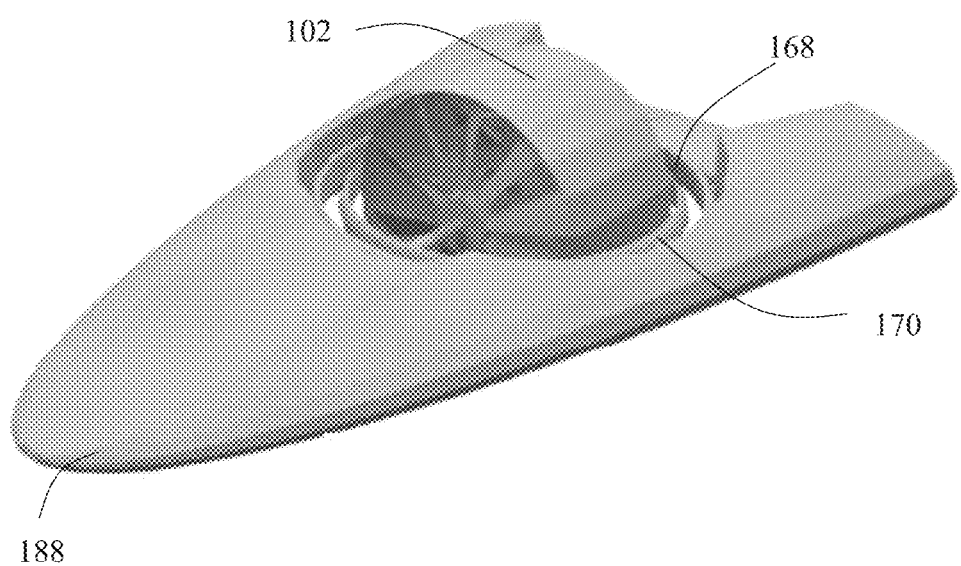
FIG. 16C is a perspective view of an embodiment of the mounting system secured to a craft having a single convertible engine with the engine shown in an axial propulsion orientation.

An embodiment of the gyroscopic mounting system includes inner gimbal 170 and middle gimbal 168, without outer gimbal 166. This embodiment still includes middle gimbal 168 mechanically secured to an aircraft or other vehicle through pivoting pins similar to pins 172. An example of such a configuration is depicted in FIGS. 16, which are described in more detail below.

In an embodiment, the interface between the gimbals, instead of passive pivots, are driven by small motors to achieve various orientations and control of a craft employing the gyroscopically mounted convertible engine. The motors are controlled through a control system as briefly explained above. The orientation of each gimbal can be adjusted to move the engine into a particular orientation for various modes of operation. In an embodiment, rotational motors reside within or near pivot pins 172 and 174 to cause rotation of their respective gimbals and/or the pivot pins themselves. The orientation of each gimbal may be controlled by any method known to a person of ordinary skill in the art, including but not limited to mechanical, electromechanical, electromagnetic, or magnetic devices.

Figure 11:
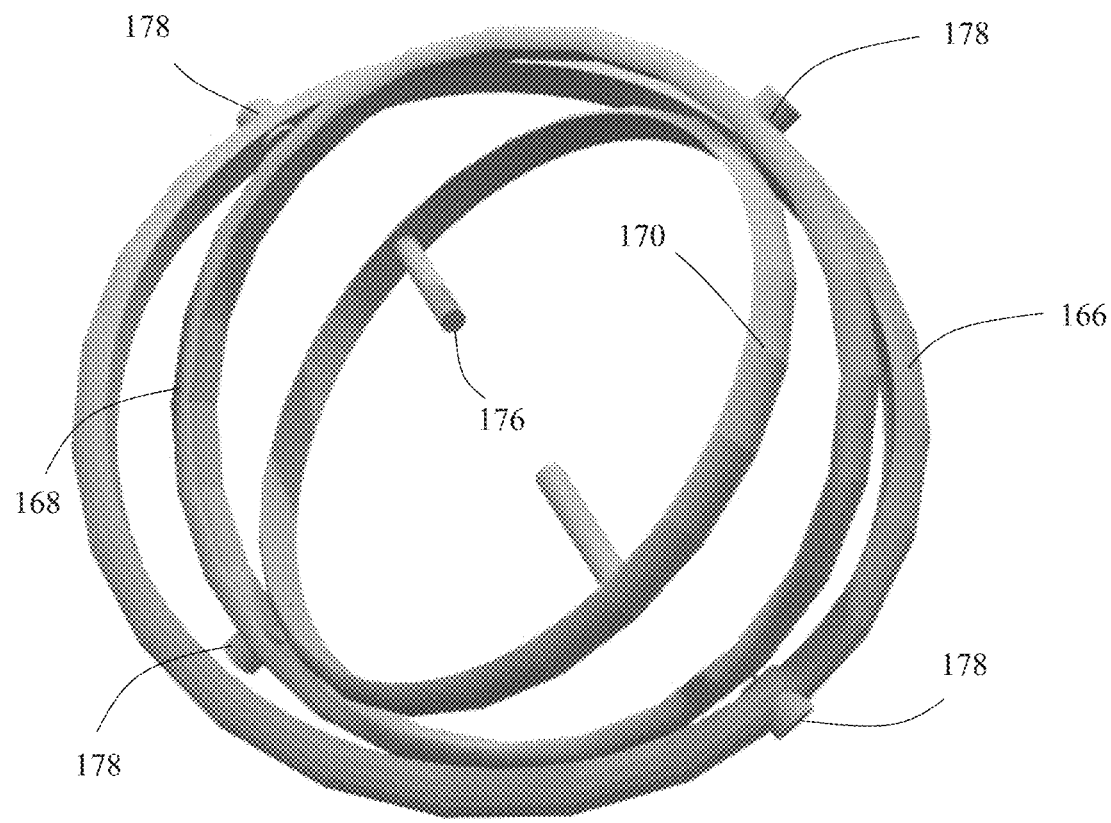
FIG. 11 is an embodiment of the mounting system having rotational motors to orient the gimbal rings.

FIG. 11 illustrate one example of the controlling mechanisms that enable the gimbals to rotate with respect to each other. Rotational motors 178 reside are mechanically coupled to pivot pins 172 and 174, such that operation of rotational motors 178 rotate pins 172 and 174. The pins are also mechanically coupled to at least one gimbal, such that rotation of pins 172 and 174 in turn cause relative rotation of the respective gimbals 166, 168, and 170.

Figure 12:
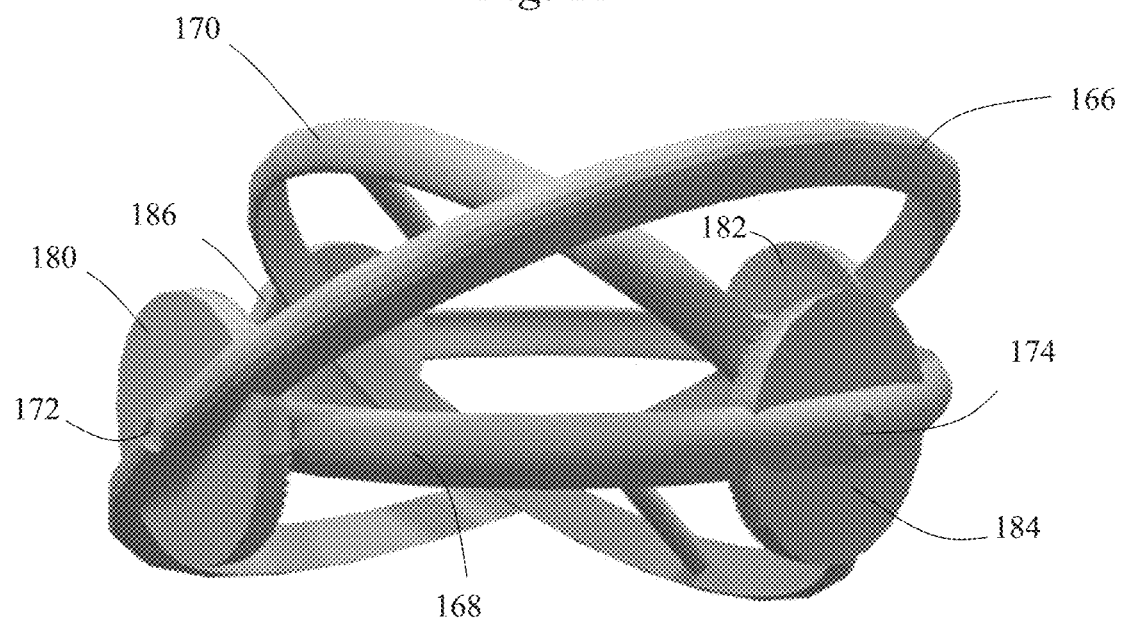
FIG. 12 is an embodiment of the mounting system having an electromagnetic assembly to orient the gimbal rings.

Referring now to FIGS. 12, an embodiment includes permanent magnets (PMs) and circular arrays of electromagnets (EM) for rotating the gimbals with respect to each other. As depicted, diametrically opposed circular EM arrays 180, 182 are secured to outer gimbal 166 around pivot pin 172. Middle gimbal 168 has a pair of PMs on each side of each pivot pin 172 for a total of 4 PMs. Circular EM arrays 180, 182 use magnetic force to alter the orientation of the PMs to rotate middle gimbal 168 about pivot pins 172. Likewise, middle gimbal 168 includes diametrically opposed circular EM arrays 184, 186 are secured to outer gimbal 168 around pivot pin 174. Inner gimbal 170 has a pair of PMs on each side of each pivot pin 174 for a total of 4 PMs. Circular EM arrays 184, 186 use magnetic force to alter the orientation of the PMs to rotate inner gimbal 170 about pivot pins 174. While each assembly of PMs and circular EM arrays are oriented such that the array is further from the shroud than the corresponding PMs, this orientation could be flipped and each assembly would operate in a similar fashion.

In an embodiment, outer gimbal 166 is pivotally connected to the body of the craft (see e.g., FIG. 15). This pivotable connection may be in the form of two diametrically opposed pivot pins similar to pivot pins 172, 174. Said pivot pins residing between outer gimbal 166 and the body of the craft will also be controlled similar to pivot pins 172, 174. In an embodiment, small motors control the orientation of outer gimbal 166 with respect to the body of the craft. The orientation of outer gimbal 166 may be controlled by any method known to a person of ordinary skill in the art, including but not limited to mechanical, electromechanical, electromagnetic, or magnetic devices. In addition, the same mechanisms shown in FIGS. 11-12 may be used to control the orientation of outer gimbal 166 with respect to the craft body.

In an embodiment, outer gimbal 166 includes two or more equidistantly spaced pins extending outwardly from outer ring 166 that engage a circular track system integrated with or secured to craft 188. The circular track system is adapted to rotate outer ring 166 about a center axis that is, in some embodiments, normal (or "vertical") with respect to the craft. The rotation about the track may be controlled by any method known to a person of ordinary skill in the art, including but not limited to mechanical, electromechanical, electromagnetic, or magnetic devices. In an embodiment, the circular track can be incorporated or attachable to the craft itself, outer gimbal ring 166, middle gimbal ring 168, and/or inner gimbal ring 170. In embodiments having less than three gimbal rings, a circular track can be incorporated or attachable to the craft itself or any of the gimbal rings.

Figure 13:
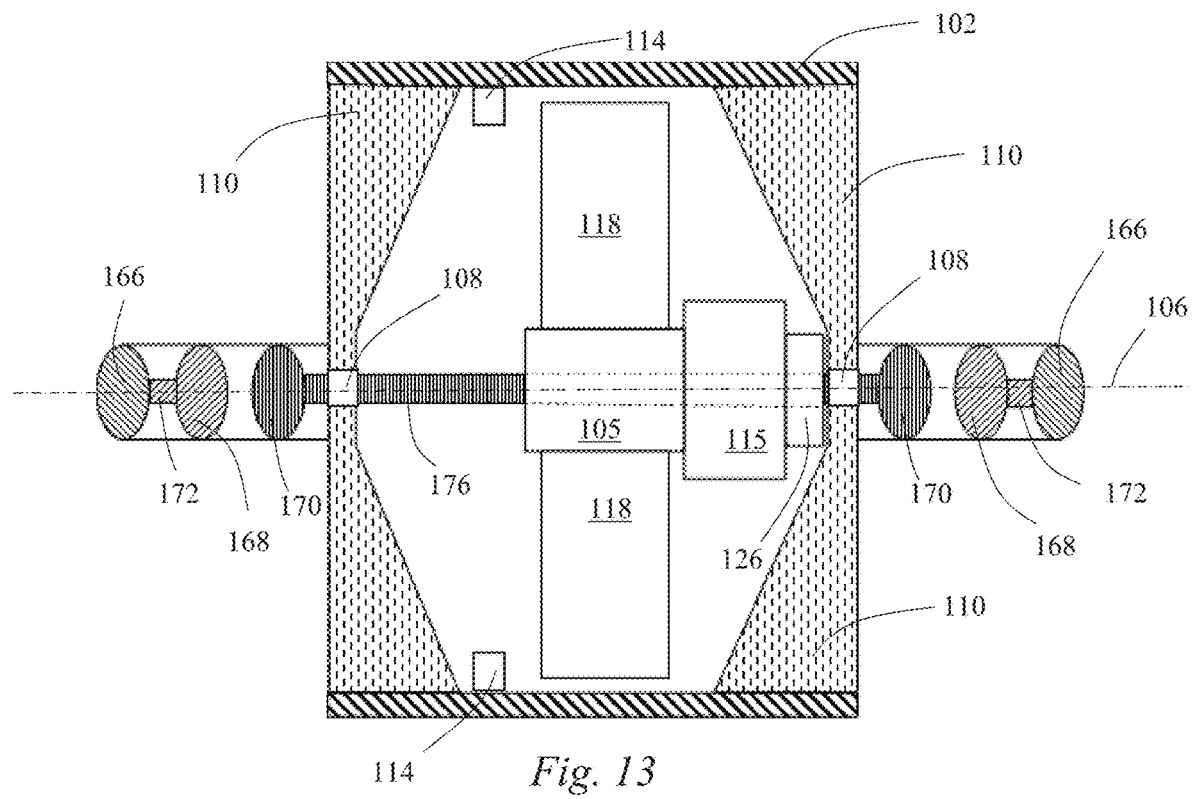
FIG. 13 is a sectional view of an embodiment in which the engine has a single mechanical fan.
Figure 14:
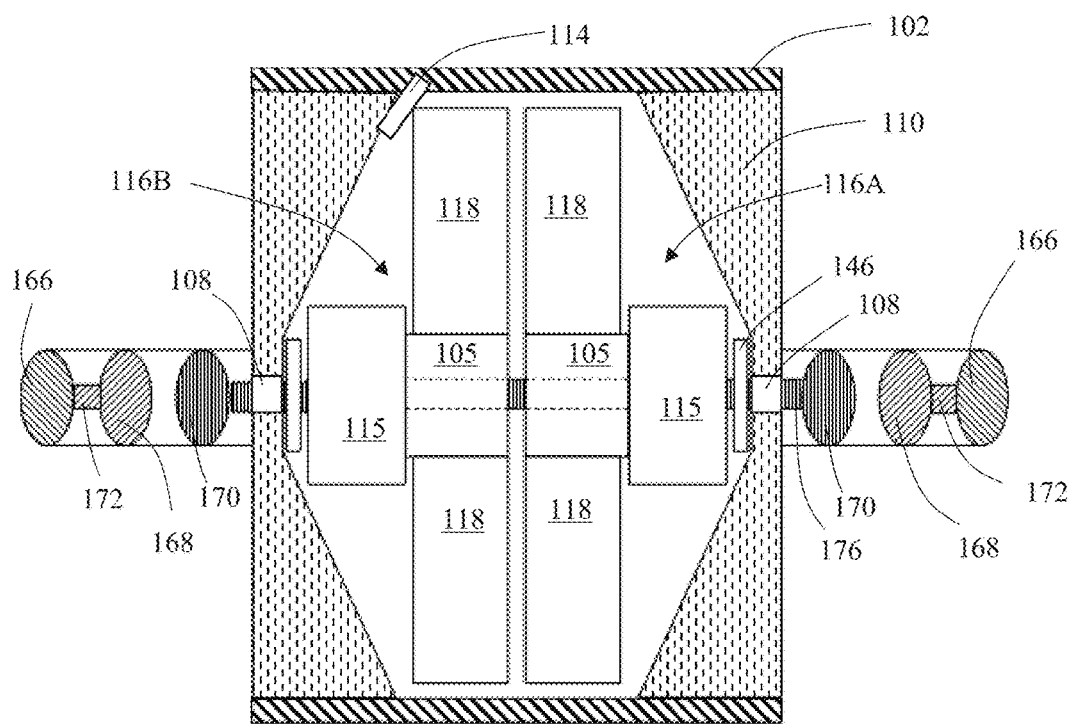
FIG. 14 is a sectional view of an embodiment in which the engine having dual mechanical fans.

As best shown in FIGS. 13-14, inner gimbal 170 further includes axel 176 on which the fan motor(s) are mounted. The rotational axis of the mechanical fan coincides with the longitudinal axis of axel 176. The longitudinal axis of axel 176 is perpendicular to first rotational axis 171 established by pins 174 (not visible in FIGS. 13-14), however, an embodiment may include the longitudinal axis of axel 176 being neither parallel nor perpendicular to first rotational axis 171.

In an embodiment, linear drive motor 126 translates mechanical fan 116 towards or away from blade contacting flanges 114. As a result, linear drive motor 126 controls whether the fan is free to rotate with respect to shroud 102 to produce thrust or if mechanical fan 116 engages shroud 102 to operate as a rotating wheel. While the embodiment depicted shows a system in which the blades are translated along longitudinal axis 106 to bring blades 118 into contact with flange 114, the engagement between the fan and the shroud may occur via any method described within this application.

In an embodiment, each fan motor is rotationally fixed to axel 176 and rotational drive shaft 105 ensleeves axel 176 in such a way to allow drive shaft 105 to free rotate about axel 176 and in turn freely rotate fan 116 which is secured to drive shaft 105. Axel 176 also passes through shroud collar 108. Axel 176 effectively acts as shroud shaft 104 described in previous embodiment of the convertible engine. Axel 176 is centrally aligned with longitudinal axis 106 of shroud 102 and passes through collar 108. Collar 108 is also centrally aligned with longitudinal axis 106 and is fixed in place through supports 110, which extend radially to the internal surface of shroud 102. Collars 108 are free rotate about axel 176, such that shroud 102 can operate as a drive-wheel.

In an embodiment, a clutch system is used to temporarily fix collar(s) 108 to axle 176 to prevent relative rotation. When engaged, the clutch prevents collar 108, and in turn shroud 102, from rotating about axel 176, which may be desired when the engine is in a thrust producing configuration. When the clutch is disengaged, collar 108, and in turn shroud 102, is free to rotate about axel 176, which is necessary for the engine to operate in the drive-wheel configuration.

Referring now to FIG. 14, an embodiment of the convertible engine and mounting system includes two fans 116a, 116b operating within shroud 102. In the depicted embodiment, each fan includes its own motor 115 and drive shaft 105. In an embodiment, the motors rotates the blades in opposite direction with respect to each other. In an embodiment, fans 116A, 116B operate in a counter rotating manner via a contra rotating propeller drive system, powered by a single motor. In accordance with the counter rotating operation, the blades for each fan are oriented such that the generated thrust is produced in the same direction during operation of both fans.

Having two fans also provides the added benefit of negating the inherent torque generated by a single rotating fan. The counterrotation of the two motors has the effect of cancelling the inertial effects of a rotating mass (e.g., the gyroscopic effect). This is especially important in applications of this design in fluids as torque must be overcome to maintain stability. In the axial mode torque would result in uncontrolled roll and in the vertical takeoff and landing mode (VTOL) it would result in uncontrolled yaw. This could be overcome by several other methods including control surfaces or the addition of another force countering motor (i.e., secondary rotating fans/blades) similar to a helicopter's tail rotor, to counteract the torque generated from the single fan in the convertible engine.

While the depicted embodiment in FIG. 14 shows fore and aft collars 108 with their respective support members 110, a single collar 108 may be disposed near the middle of the shroud between the two fans. In addition, an embodiment may include the fan oppositely oriented with respect to FIG. 14, such that the blades are nearest the fore and aft ends of the shroud and the motors are proximate each other.

As depicted the convertible engine includes rotatable blade-contacting flange 114. Blade-contacting flange 114 has a first orientation in which it is not in contact with blades 118 and a second orientation in which blade-contacting flange 114 is rotated into contact with blades 118. In addition, clutch 146 resides between collar 108 and motor 115. Clutch is either in an engaged setting in which collar 108 cannot rotate with respect to motor 115 or in a disengaged setting in which collar 108 can rotate with respect to motor 115. Motor 115 is preferably secured to axle 176 in a non-rotational manner, while blades 118 remain free to rotate about axle 176. When clutch 146 is engaged, collar 108 and in turn shroud 102 cannot rotate with respect to axle 176, but the blades remain free to rotate. This configuration is the propulsion generating configuration. When clutch 146 is disengaged, collar 108 and in turn shroud 102 can rotate with respect to axle 176 and if blades 118 contact blade contacting flange 118, shroud 102 will rotate with blades 118 about axle 176. This configuration is the drive-wheel configuration.

Alternatively, blade-contacting flange(s) 114 can be translated or telescoped inwardly to bring the blade-contacting flange(s) into an out of contact with blades 118. In such, embodiments, it is not necessary to translate the mechanical fan in the longitudinal direction. Instead, the blade-contacting flanges are moved. In an embodiment, the blade contacting flanges may be any structural component adapted to engage one or more of the blades, the rotating drive shaft, and/or the rotating body.

Alternatively, the double fan embodiment may employ any of the previously described structural components to allow the convertible engine to operate as both a fluid propulsion engine and a drive-wheel.

In an embodiment of the counter-rotating double fan engine, each motor is individually powered and operated. Through independent manipulation of motors, differential motor rates can be used to cause the shroud to rotate in terrestrial mode if the shroud is free to rotate, i.e., not clutched to one of the motors.

The conversion of the engine from a drive-wheel configuration to a propulsion configuration can be seen in FIG. 15. It should be noted that the depicted and described transition below is one of many ways to alter the orientation of the engine for different operations. Moreover, while the depicted embodiment show a craft with a single engine system, the conversion steps are generally the same for a craft having a different body shape and/or additional convertible engines.

The depicted embodiment includes three gimbal rings 166, 168, 170 with outer gimbal 166 in mechanical communication with the body of the craft. There are two or more equidistantly spaced pins extending outwardly from outer ring 166 that engage a circular track system integrated with or secured to craft 188. The circular track system is adapted to rotate the outer ring about a center axis that is normal (or "vertical") axis of the craft, using mechanical and/or electromagnetic components known to a person of ordinary skill in the art. This rotation is depicted in FIG. 15 by rotational arrow 190. In an embodiment, there are two diametrically opposed pins extending outwardly from outer gimbal 166 which are adapted to cause outer gimbal 166 to rotate about a third axis extending through both of the pins.

In an embodiment, a circular track can be incorporated or attachable to the craft itself, outer gimbal ring 166, middle gimbal ring 168, and/or inner gimbal ring 170. In embodiments having less than three gimbal rings, a circular track can be incorporated or attachable to the craft itself or any of the gimbal rings. The circular track system can be controlled via any control system known to a person of ordinary skill in the art.

Referring now to FIG. 15A, the convertible engine is in a drive-wheel configuration and can roll along a ground surface. Directional steering can be achieved by rotating inner ring 170 about first axis 171 extending between pins 174 and/or rotating outer ring 166 about the vertical axis. Pitch is not required to be controlled in this configuration and compensation for rotational inertial forces are unnecessary due to the relatively low rotational speed of the motor. Steering can be supplemented by the addition of steering/guide wheels or skids.

In converting to a vertical thrusting (or "VTOL") configuration, outer ring 166 is rotated about the vertical axis in accordance with arrow 190, and inner ring 170 is rotated about first axis 171 passing through pins 174 in accordance with arrow 192. During this transition phase, the engine will move to the propulsion configuration and will at some point appear as shown in FIG. 15B. To reach the VTOL configuration shown in FIG. 15C, outer ring 166 is rotated 90 degrees about the vertical axis and inner ring 170 is rotated 90 degrees about first axis 171 passing through pins 174.

Figure 15D:
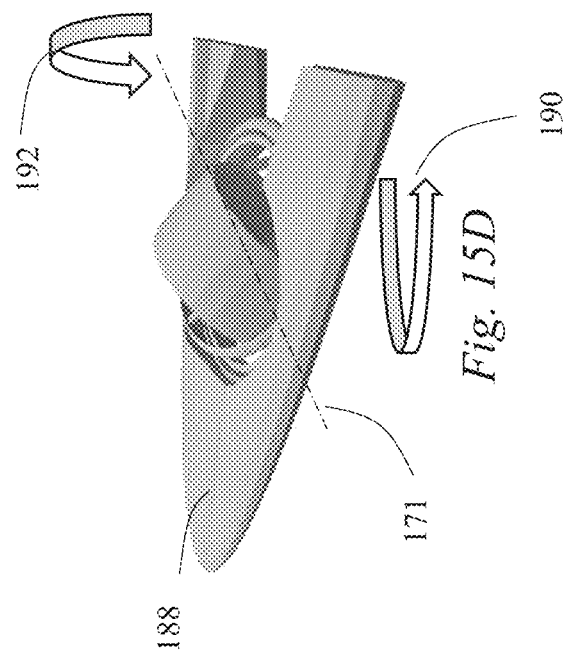
FIG. 15D is a perspective view of an embodiment of the mounting system secured to a craft having a single convertible engine with the engine shown transitioning from a VTOL orientation to an axial propulsion orientation.
Figure 15E:
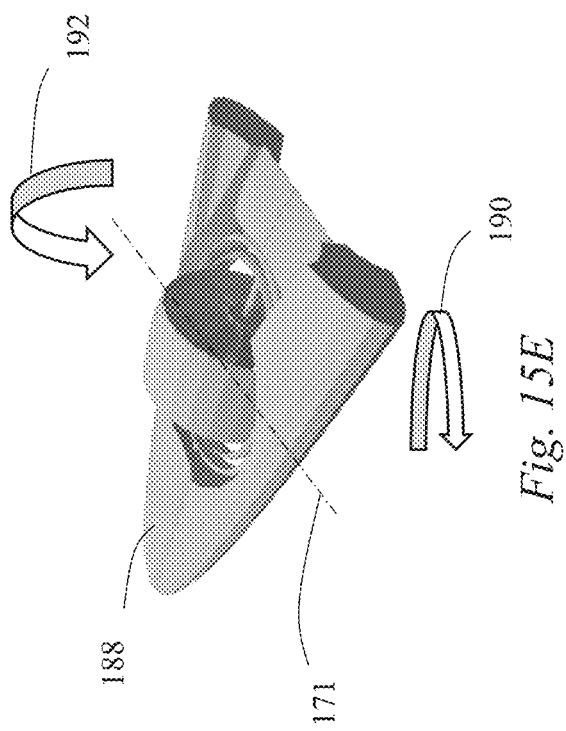
FIG. 15E is a perspective view of an embodiment of the mounting system secured to a craft having a single convertible engine with the engine shown in an axial propulsion orientation.

To reach a position in which the engine produces thrust axially aligned with the longitudinal axis of the craft, outer ring 166 is rotated further about the vertical axis in accordance with arrow 190, and inner ring 170 is rotated further about first axis 171 in accordance with arrow 192. Prior to reaching the axial orientation, the engine will be orientated as shown in FIG. 15D. To reach the axial orientation shown in FIG. 15E from the VTOL orientation shown in FIG. 15C, outer ring 166 is again rotated 90 degrees about the vertical axis and inner ring 170 is also rotated 90 degrees about first axis 171.

Depending on whether there is a single fan or multiple fans operating with the shroud, the direction of rotation about the various axes could be altered. In addition, both FIGS. 15B and 15D show port and starboard angled thrust vectoring, which can be used to steer the craft. The ability of the engine to rotate about the circular track and about first and second axes 171, 173 passing through pins 174, 172, respectively, allows the engine to be directed in any direction in both the propulsion and drive-wheel configuration.

Due to the unique nature of this design, thrust vectoring allows the craft to transition seamlessly from VTOL to axial flight or from a terrestrial mode (drive-wheel operation) to VTOL flight. It is also possible to transition from axial to terrestrial with the addition of landing gear, which may be employed in a certain embodiment. This design can further be translated into numerous maritime applications as a submarine or a surface craft using the same drive and control systems compensating for the density of the medium.

Referring now to FIGS. 16, an embodiment of the mounting system only includes two gimbals 168, 170 interconnected via rotational pins 174. Essentially, outer gimbal 166 has been removed. The embodiment, however, does include the circular track system integrated into or secured to craft 188. Gimbal 168 includes the diametrically opposed pins 172, which rotate gimbal 168 about the axis extending through pins 172. Pins 172 also engage the circular track such that gimbal 168 can be rotated about the craft's vertical/normal axis. Even without outer gimbal 166, the mounting system still maintains three degrees of freedom (circular track system, rotational pins 172, and rotational pins 174) and can direct the engine in any direction.

Figure 17:
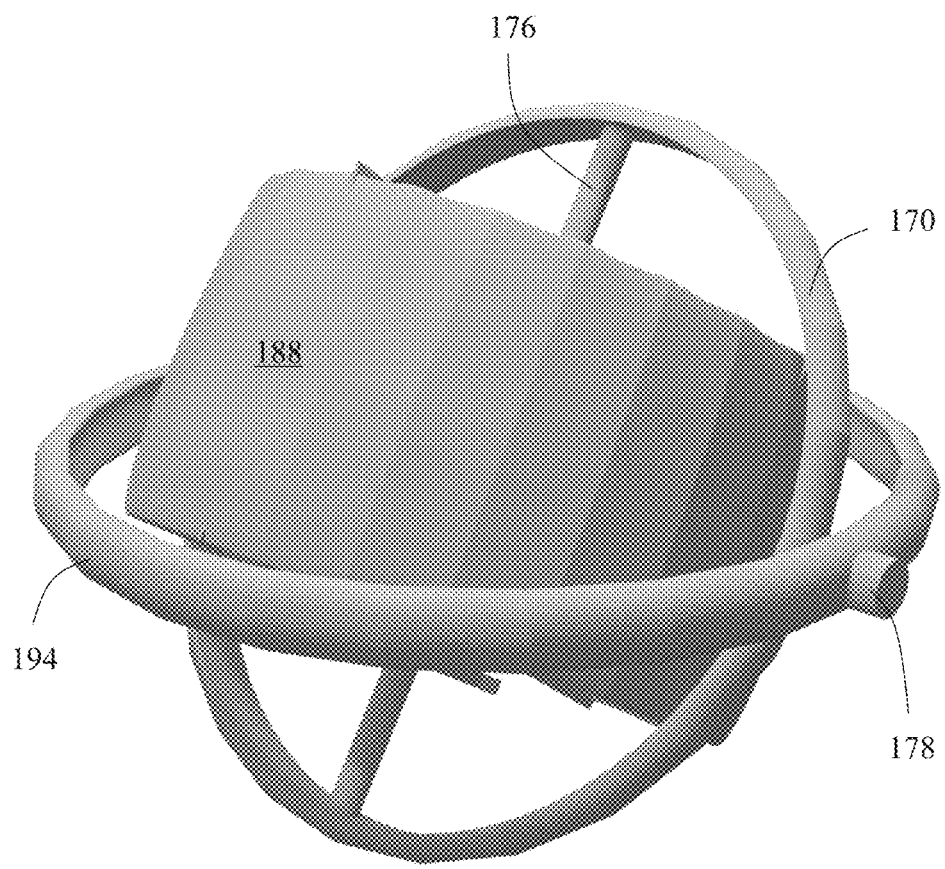
FIG. 17 is a perspective view of an embodiment of the mounting system.

Referring now to FIG. 17, an embodiment of the mounting system only includes one gimbal 170 interconnected with circular track system 194 via rotational pins 174. Essentially, gimbals 166 and 168 have been removed. As depicted, circular track system 194 is shown detached from the craft body, however, circular track system 194 can be integrated or attachable to the craft. Gimbal 170 includes the diametrically opposed pins 174, which rotate gimbal 170 about first axis 171 extending through pins 174. Pins 174 also engage circular track/gear system 194 such that gimbal 170 can be rotated about the craft's vertical/normal axis. Even without gimbals 166 and 168, the mounting system still maintains two degrees of freedom (circular track system and rotational pins 174) and can direct the engine in any direction, albeit in a slower manner.

In an embodiment, the any of the disclosed mounting systems and convertible engines can be mounted to a craft of any shape/design and any number of mounting systems and engines can be employed. For example, an embodiment includes the craft having a symmetric shape in the horizontal plane.

In an embodiment, the circular track system can be disposed within one or more of the gimbal rings. In an embodiment, the circular track system can be disposed within one or more of the gimbal rings and the mounting system can attach to the craft via two diametrically opposed pivotable pins similar to pivotable pins 172 and 174.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A ducted fan engine, comprising:
   a motor;
   a mechanical fan configured to be rotated by the motor about a rotational axis, the mechanical fan having a plurality of blades;
   a shroud that at least partially surrounds the mechanical fan or motor;
   a fluid-propulsion configuration in which the mechanical fan independently rotates with respect to the shroud to produce thrust through fluid flow;
   a drive-wheel configuration in which the mechanical fan and/or a rotational component of the motor is configured to cause the shroud to rotate about the rotational axis in response to rotation of the mechanical fan and/or the rotational component of the motor.

2. The ducted fan engine of claim 1, further including:
   an aft collar in non-rotational mechanical communication with the shroud, the aft collar having a first interlocking component;
   the mechanical fan having a second interlocking component;
   the fluid-propulsion configuration including the first interlocking component and the second interlocking component operably disengaged; and
   the drive-wheel configuration including the first interlocking component and the second interlocking component operably engaged.

3. The ducted fan engine of claim 2, further including a spring applying a biasing force that causes the second interlocking component to move towards the first interlocking component or the first interlocking component to move towards the second interlocking component.

4. The ducted fan engine of claim 2, wherein the second interlocking component is disposed on a hub of the mechanical fan, the hub being radially closer to the rotational axis than the plurality of blades.

5. The ducted fan engine of claim 1, further including:
   a fore translation collar in non-rotational mechanical communication with the shroud, the fore translation collar having a first interlocking component;
   the mechanical fan having a second interlocking component;
   the fluid-propulsion configuration including the first interlocking component and the second interlocking component operably disengaged; and
   the drive-wheel configuration including the first interlocking component and the second interlocking component operably engaged.

6. The ducted fan engine of claim 5, further including a spring applying a biasing force that causes the second interlocking component to move towards the first interlocking component or the first interlocking component to move towards the second interlocking component.

7. The ducted fan engine of claim 5, wherein the second interlocking component is disposed on a hub of the mechanical fan, the hub being radially closer to the rotational axis than the plurality of blades.

8. The ducted fan engine of claim 1, further including a tread disposed on an outer surface of the shroud, thereby providing traction between a shroud-contacting surface and the shroud when the ducted fan engine operates in the drive-wheel configuration.

9. A ducted fan engine, comprising:
   a motor;
   a mechanical fan configured to be rotated by the motor about a rotational axis, the mechanical fan having a plurality of blades;
   a shroud concentrically aligned with the mechanical fan about the rotational axis;
   a fluid-propulsion configuration in which the mechanical fan independently rotates with respect to the shroud to produce thrust through fluid flow; and
   a drive-wheel configuration in which the mechanical fan and/or a rotational component of the motor operably interacts with the shroud, such that the shroud rotates about the rotational axis in response to rotation of the mechanical fan and/or the rotational component of the motor.

10. The ducted fan engine of claim 9, further including:
    an aft collar in non-rotational mechanical communication with the shroud, the aft collar having a first interlocking component;
    the mechanical fan having a second interlocking component;
    the fluid-propulsion configuration including the first interlocking component and the second interlocking component operably disengaged; and
    the drive-wheel configuration including the first interlocking component and the second interlocking component operably engaged.

11. The ducted fan engine of claim 10, further including a spring applying a biasing force that forces the second interlocking component towards the first interlocking component or the first interlocking component towards the second interlocking component.

12. The ducted fan engine of claim 10, wherein the second interlocking component is disposed on a hub of the mechanical fan, the hub being radially closer to the rotational axis than the plurality of blades.

13. The ducted fan engine of claim 9, further including:
a fore translation collar in non-rotational mechanical communication with the shroud, the fore translation collar having a first interlocking component;
the mechanical fan having a second interlocking component;
the fluid-propulsion configuration including the first interlocking component and the second interlocking component operably disengaged; and
the drive-wheel configuration including the first interlocking component and the second interlocking component operably engaged.

14. The ducted fan engine of claim 13, further including a spring applying a biasing force that forces the second interlocking component towards the first interlocking component or the first interlocking component towards the second interlocking component.

15. The ducted fan engine of claim 13, wherein the second interlocking component is disposed on a hub of the mechanical fan, the hub being radially closer to the rotational axis than the plurality of blades.

16. The ducted fan engine of claim 9, further including a tread disposed on an outer surface of the shroud, thereby providing traction between a shroud-contacting surface and the shroud when the ducted fan engine operates in the drive-wheel configuration.

17. A ducted fan engine, comprising:
a motor;
a mechanical fan configured to be rotated by the motor about a rotational axis, the mechanical fan having a plurality of blades concentrically arranged about the rotational axis;
a shroud concentrically aligned with the mechanical fan about the rotational axis;
a fluid-propulsion configuration in which the mechanical fan independently rotates with respect to the shroud to produce thrust through fluid flow; and
a drive-wheel configuration in which the mechanical fan and/or a rotational component of the motor operably engages a collar that is in mechanical communication with the shroud, such that the shroud rotates about the rotational axis in response to rotation of the mechanical fan and/or the rotational component of the motor.

18. The ducted fan engine of claim 17, further including:
a collar in non-rotational mechanical communication with the shroud, wherein the collar is concentrically aligned with the shroud and has a first interlocking component;
the mechanical fan having a second interlocking component;
the fluid-propulsion configuration including the first interlocking component and the second interlocking component operably disengaged; and
the drive-wheel configuration including the first interlocking component and the second interlocking component operably engaged.

19. The ducted fan engine of claim 18, further including a spring applying a biasing force that forces the second interlocking component towards the first interlocking component or the first interlocking component towards the second interlocking component.

20. The ducted fan engine of claim 18, wherein the second interlocking component is disposed on a hub of the mechanical fan, the hub being radially closer to the rotational axis than the plurality of blades.

* * * * *